COMBINED DIRECT DISPATCH TELEPHONE EXCHANGE MOBILE RADIO SYSTEM

Filed Dec. 12, 1958 9 Sheets-Sheet 1

| | | |
|---|---|---|
| FIG. 1 | FIG. 2 | FIG. 3 |
| FIG. 4 | FIG. 5 | FIG. 6 |
| FIG. 7 | FIG. 8 | FIG. 9 |

INVENTOR
R. W. COLLINS
BY John E. Cassidy
ATTORNEY

INVENTOR
R. W. COLLINS
BY John E. Cassidy
ATTORNEY

Oct. 18, 1960 R. W. COLLINS 2,957,048

COMBINED DIRECT DISPATCH TELEPHONE EXCHANGE MOBILE RADIO SYSTEM

Filed Dec. 12, 1958 9 Sheets-Sheet 3

INVENTOR
R. W. COLLINS
BY John E. Cassidy
ATTORNEY

COMBINED DIRECT DISPATCH TELEPHONE EXCHANGE MOBILE RADIO SYSTEM

Filed Dec. 12, 1958 9 Sheets-Sheet 4

INVENTOR
R. W. COLLINS
BY
John E. Cassidy
ATTORNEY

Oct. 18, 1960 R. W. COLLINS 2,957,048

COMBINED DIRECT DISPATCH TELEPHONE EXCHANGE MOBILE RADIO SYSTEM

Filed Dec. 12, 1958 9 Sheets-Sheet 5

INVENTOR
R. W. COLLINS
BY John E. Cassidy
ATTORNEY

COMBINED DIRECT DISPATCH TELEPHONE EXCHANGE MOBILE RADIO SYSTEM

Filed Dec. 12, 1958

INVENTOR
R. W. COLLINS
BY
John E. Cassidy
ATTORNEY

Oct. 18, 1960 R. W. COLLINS 2,957,048

COMBINED DIRECT DISPATCH TELEPHONE EXCHANGE MOBILE RADIO SYSTEM

Filed Dec. 12, 1958 9 Sheets-Sheet 7

INVENTOR
R. W. COLLINS

BY John E. Cassidy

ATTORNEY

COMBINED DIRECT DISPATCH TELEPHONE EXCHANGE MOBILE RADIO SYSTEM

Filed Dec. 12, 1958 9 Sheets-Sheet 8

INVENTOR
R. W. COLLINS
BY John E. Cassidy
ATTORNEY

INVENTOR
R. W. COLLINS
BY
John E. Cassidy
ATTORNEY

United States Patent Office 2,957,048
Patented Oct. 18, 1960

2,957,048

COMBINED DIRECT DISPATCH TELEPHONE EXCHANGE MOBILE RADIO SYSTEM

Russell W. Collins, Baldwin, N.Y., assignor to Bell Telephone Laboratories, Incorporated, New York, N.Y., a corporation of New York Filed Dec. 12, 1958, Ser. No. 779,994

9 Claims. (Cl. 179—84)

Figures 1, 10:
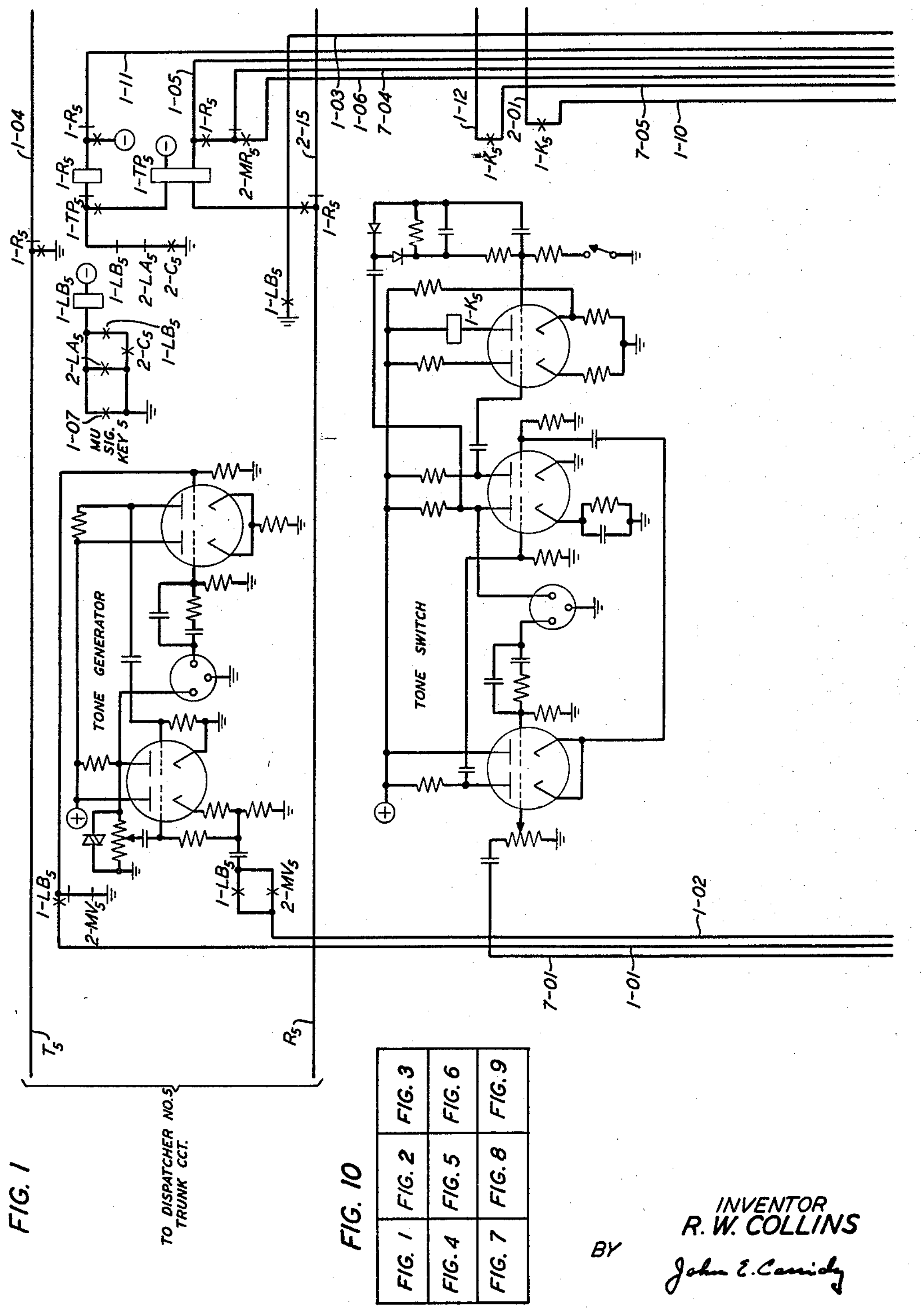

This invention pertains to two-way telephone systems and more particularly to a two-way radio telephone system. More specifically, this invention pertains to a fully automatic control and signaling circuit for use in radio telephone direct dispatch systems for interconnecting telephone stations and mobile units.

A general object of the invention is to provide an improved automatic control and signaling system whereby mobile units may be interconnected with telephone stations.

In Patent No. 2,843,675, granted to R. W. Collins on July 15, 1958, there is disclosed a system which provides two-way telephone conversation between any one of a number of telephone stations, hereinafter referred to as dispatchers' stations, and units of a mobile fleet individual to each dispatcher, characterized in that only one call can be established and maintained in the system at one time. Any dispatcher may originate a call and be connected to a central or control terminal which, if the system is idle, automatically connects the dispatcher to a radio transmitter associated with the control terminal and modulates the transmitting carrier with an audio tone individual to the mobile fleet associated with the dispatcher. This modulated carrier signal activates a loudspeaker in each mobile unit of a particular dispatcher's fleet, and thereafter the dispatcher may designate by voice the particular mobile unit for which the message is intended. If the system is busy when a dispatcher originates a call, a "call waiting" condition is registered in a sequence circuit at the control station. When the system becomes available, the dispatchers who attempted to make calls while the system was busy have access to the system in a predetermined order, not necessarily the order in which they called. Each dispatcher is apprised that the system is available by a distinctive ringing signal.

A mobile unit gains access to the system by turning on its transmitter carrier and modulating it for a short interval with a voice frequency tone individual to the fleet. If the system is available, the control station connects the calling mobile unit to the dispatcher's line individual to the fleet of which the mobile unit is a part and transmits a characteristic ringing signal over the dispatcher's line to designate a call incoming from a mobile unit.

A mobile unit cannot gain access to the system while the system is busy. However, in the event that there are one or more calls waiting at the end of a completed call, an interval is reserved for the purpose of registering the waiting calls of mobile units. This interval is terminated by transmitting acknowledgment tones from the control station to apprise the mobile units that their calls have been registered.

An object of the invention is the provision of circuitry in automatic control and signaling systems whereby mobile units, other than those associated with direct dispatch fleets, may be interconnected with telephone stations.

Another object of the invention is the provision of a control terminal which may function, not only as a dispatcher's mobile telephone system, but also as a mobile radio control terminal for interconnecting other individual mobile units with fixed subscribers' stations connected with a dial telephone exchange service.

A further object of the invention is the provision of improved circuitry for apprising mobile units that their calls have been registered.

Specifically, the system of the present invention includes means whereby mobile units, hereinafter called urban mobile units, which are other than those associated with dispatchers' fleets, and dial telephone exchanges may be interconnected through the control terminal for two-way telephone communication.

In accordance with a preferred embodiment of the present invention, a traffic operator located at a special position in a local telephone exchange may gain access to the central or control terminal by means of a two-way telephone trunk when the system is idle whereupon her circuit is connected into the sequence selection circuit at the control station. This automatically locks out all of the dispatchers and bridges a busy tone onto their lines. Next, the transmitter carrier is activated at the control terminal. Each urban mobile unit has a station selector which responds to bursts of tone. Two bursts of audio tone, one of 600 cycles and the other of 1500 cycles, are first transmitted to restore the selectors in the urban mobile units to normal. The operator is then given a "start dial" or "sender start" signal and each operator dial pulse causes the outgoing carrier to be modulated with alternate bursts of 600-cycle and 1500-cycle tones. A total of 23 or 25 pulses will be sent to designate the urban mobile unit. A final burst of 1500 cycles is then sent to deactivate the station selector and ring the urban unit.

A feature of the present invention is an acknowledgment arrangement whereby the transmission of the acknowledgment tones, when utilized to notify mobile units that their "calls waiting" registration have been accepted, is sent in a sequential manner rather than by simultaneous tone transmission.

According to another feature of the present invention the central terminal is utilized to furnish both direct dispatch service and mobile telephone service in combination with facilities which permit the traffic operator to register "calls waiting" when the system is in use.

There are many other features of the present circuit, which circuit affords a simple dispatcher control circuit, provides improved alarm facilities and embodies a central terminal for utilizing a common radio channel to furnish a combination of direct dispatch service and mobile telephone service, which features will become apparent in the detailed description hereinafter.

The detailed operation of the circuit may be understood from the following description when read with reference to the associated drawings, which disclose a preferred embodiment in which the invention is presently incorporated. It is to be understood, however, that the invention may be incorporated in other forms which may be suggested to those skilled in the art from time to time.

Figure 7:
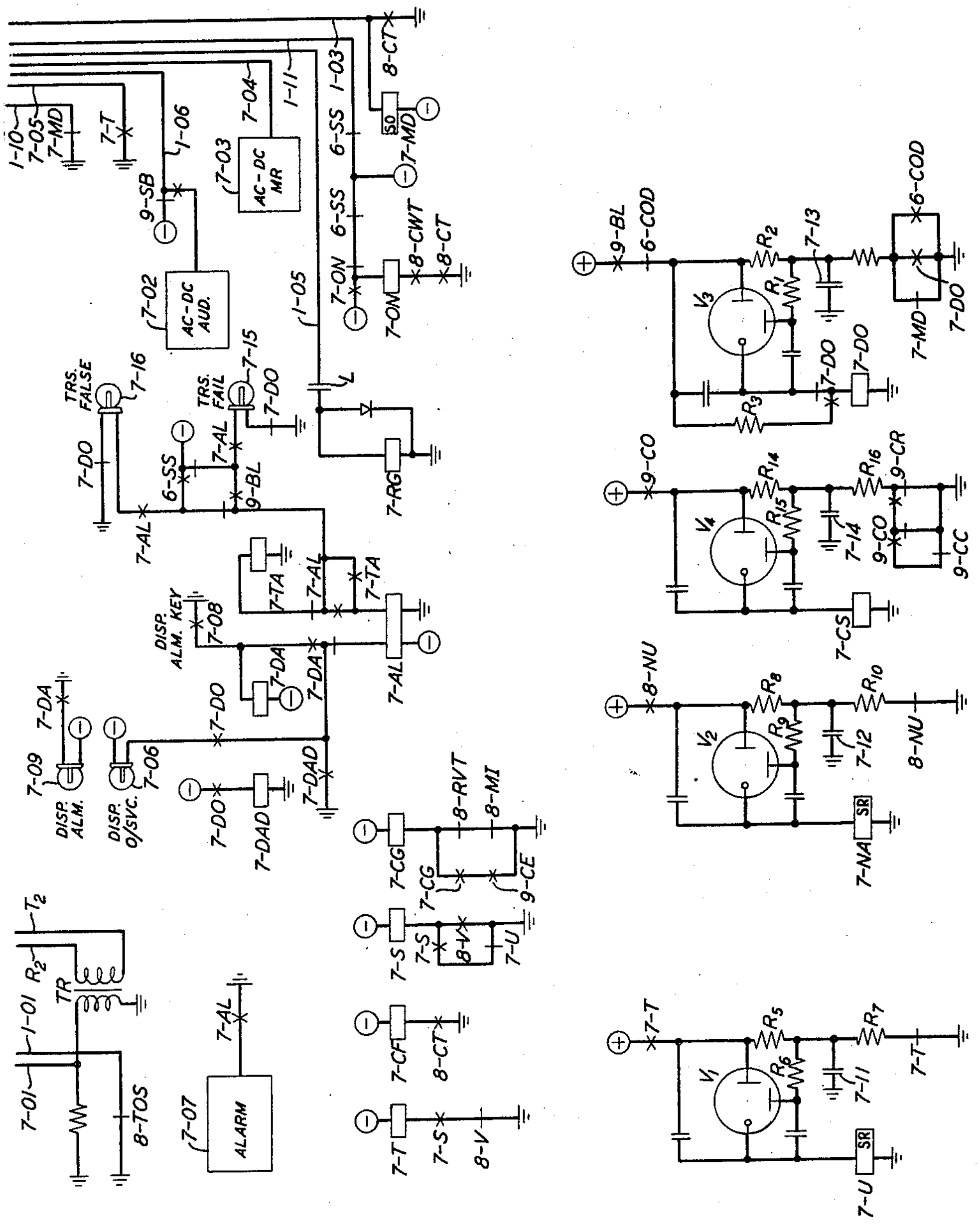
Figure 8:
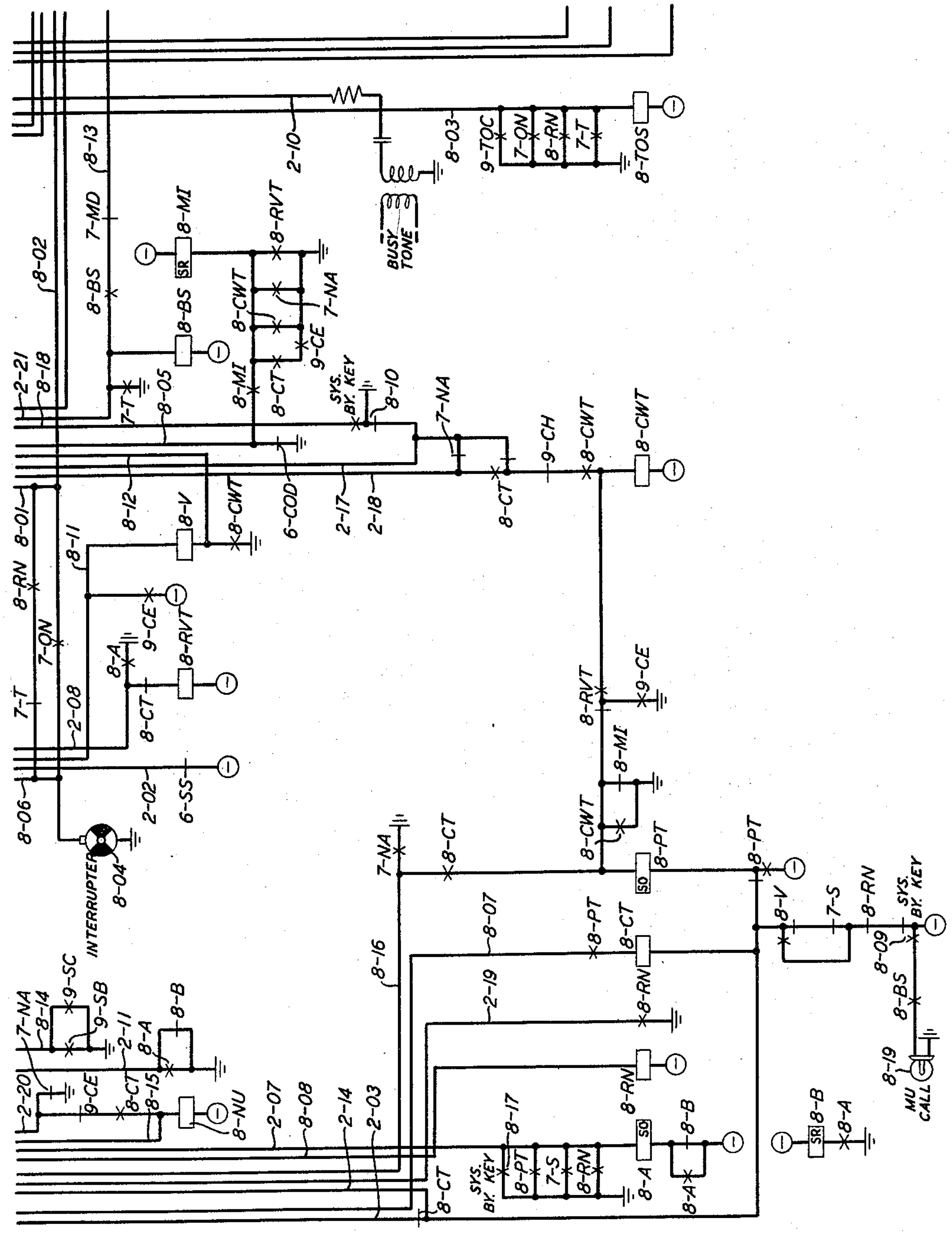
Figure 9:
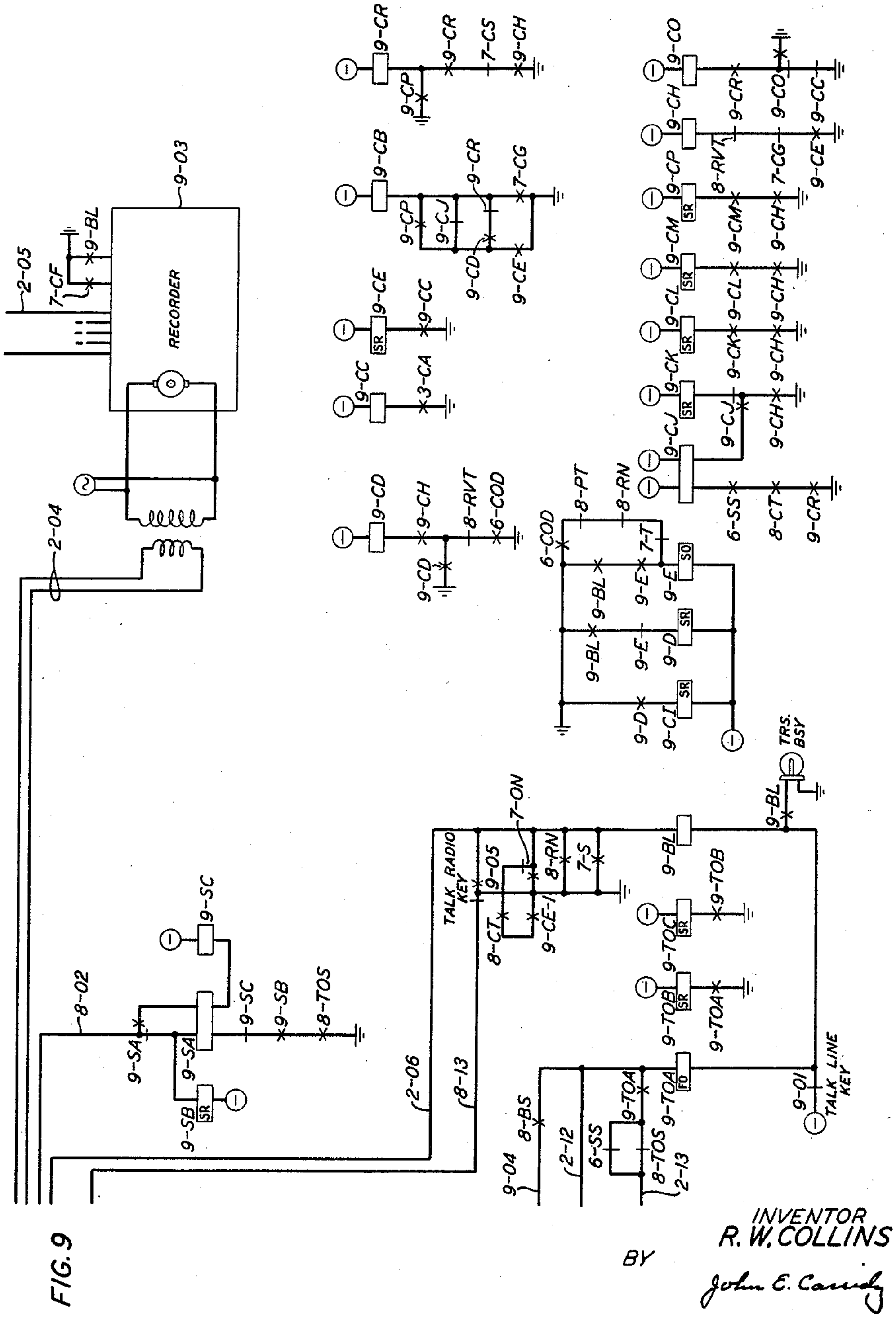

The drawings comprise ten figures, Figs. 1 to 10, inclusive, in which Fig. 1 to Fig. 9, inclusive, when arranged as shown in Fig. 9, form a unitary circuit showing the special direct dispatch and mobile telephone control terminal and signaling circuit of the invention.

In the drawing, the relay contacts are shown detached from the relay windings. The relay winding is given a letter designation preceded by a number indicating the figure number of the drawing on which the relay winding is located. Contacts associated with the relay winding are given the same number and letter designations and, where necessary, a subsequent numerical designation identifying the individual contacts. Contacts which are closed when the relay is de-energized, known as "break contacts," are represented by a single short line perpendicular to the conductor line, while contacts which are closed when the relay is energized, known as "make contacts," are represented by two short, crossed lines diagonally intercepting the conductor line.

Since Figs. 1 to 9 constitute a single unitary circuit, the component parts are not readily identifiable in terms of the separate figures. However, preliminary to the detailed description certain of the major circuit components will be identified in the general description following.

Figure 4:
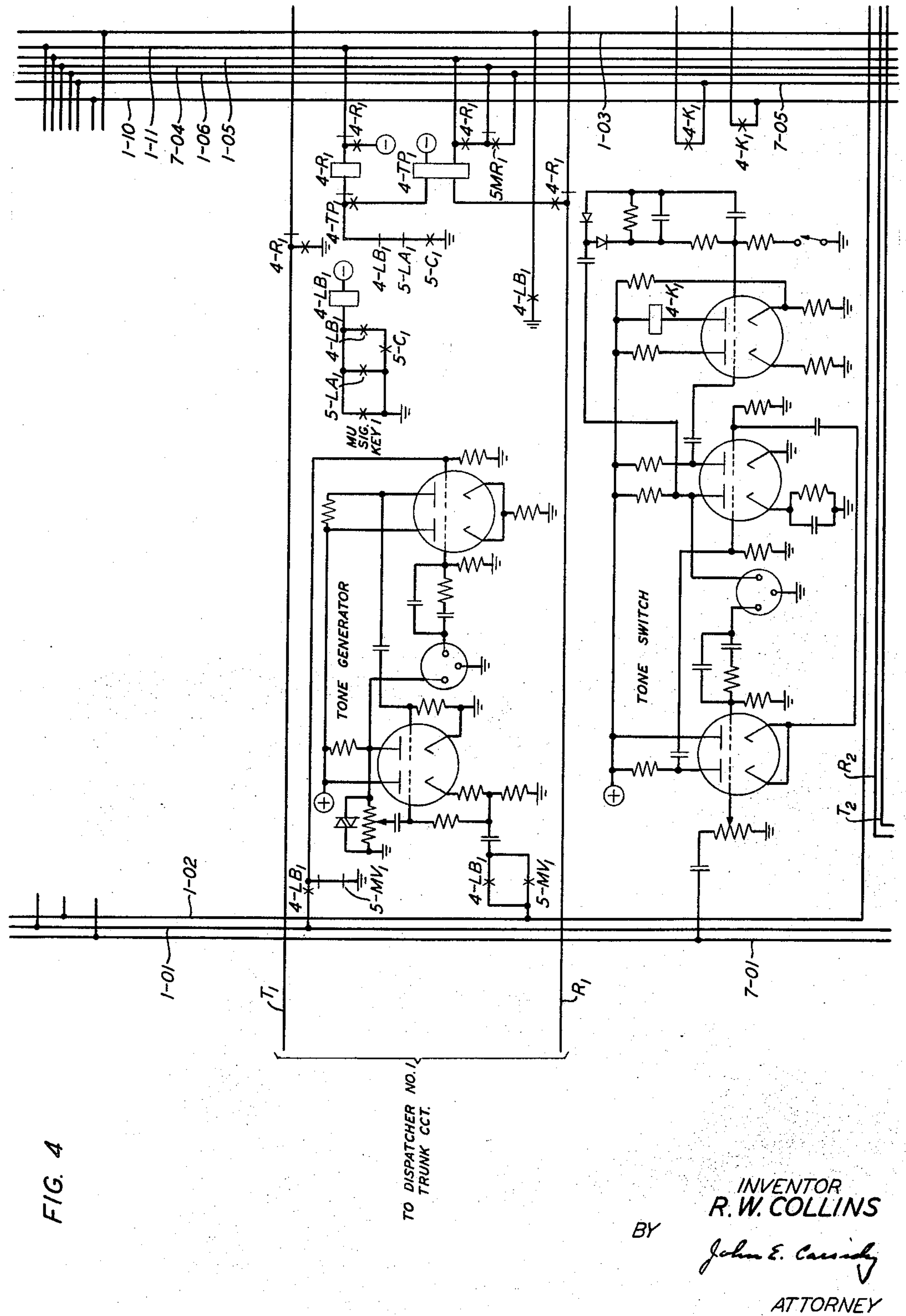

At the left in each of Figs. 1 and 4, the conductors $T_5$ and $R_5$ and $T_1$ and $R_1$ are bracketed to indicate a termination in a telephone circuit assigned to a dispatcher. It is to be understood that any number of bracketed terminations may be connected into the system.

Figure 2:
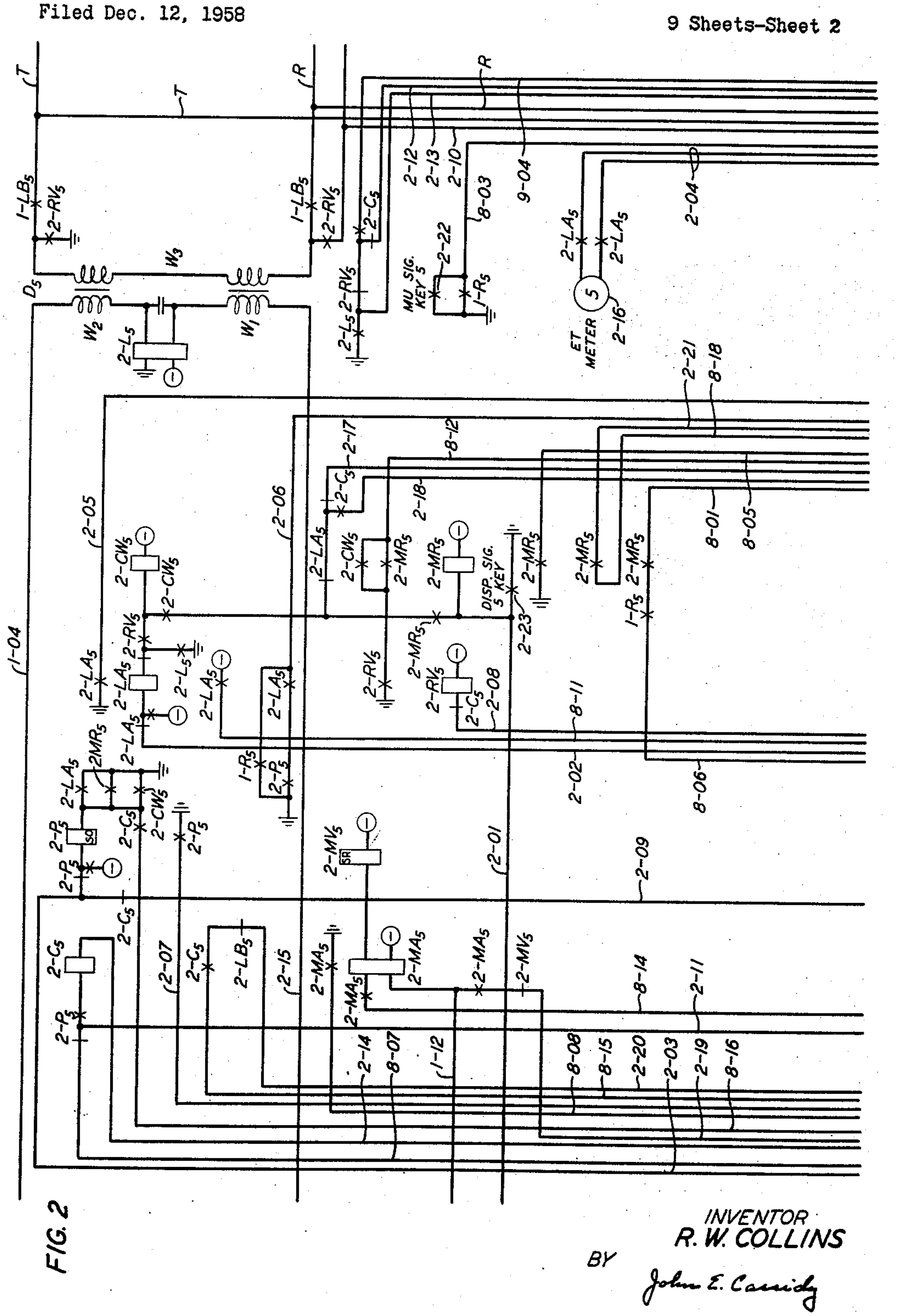
Figure 5:
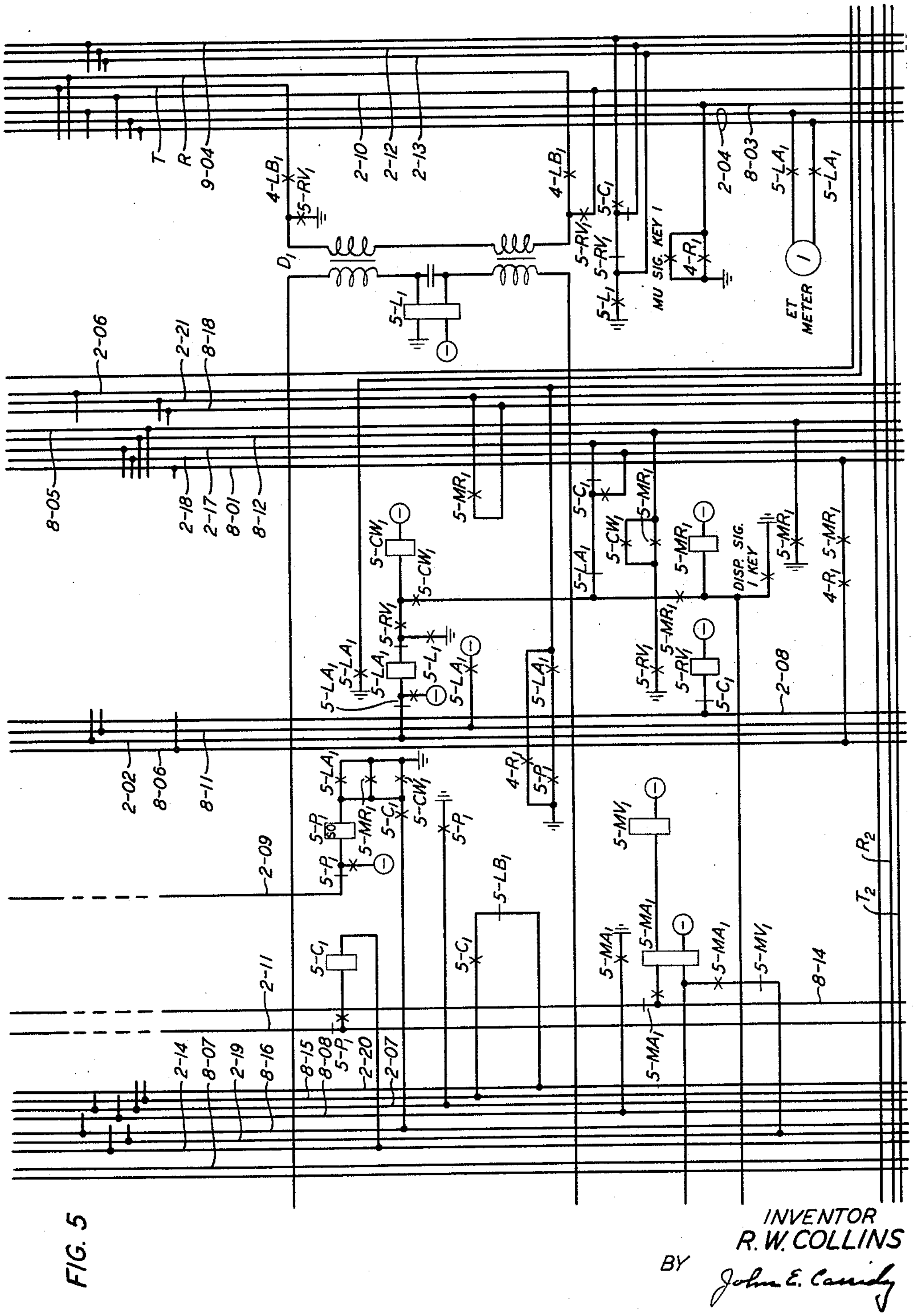

Each dispatcher has an individual channel control circuit, such as the channel control circuit of Fig. 2 associated with conductors $T_5$ and $R_5$ and the channel control circuit of Fig. 5 associated with conductors $T_1$ and $R_1$. The individual channel control circuit is the means whereby each individual dispatcher is connected to the common equipment which is located at the same base station with the channel control circuits. In the upper portion of Fig. 3, the bracketed conductors $T_0$ and $R_0$ indicate a connection to the two-way operator's trunk circuit at the general telephone switchboard.

Figure 3:
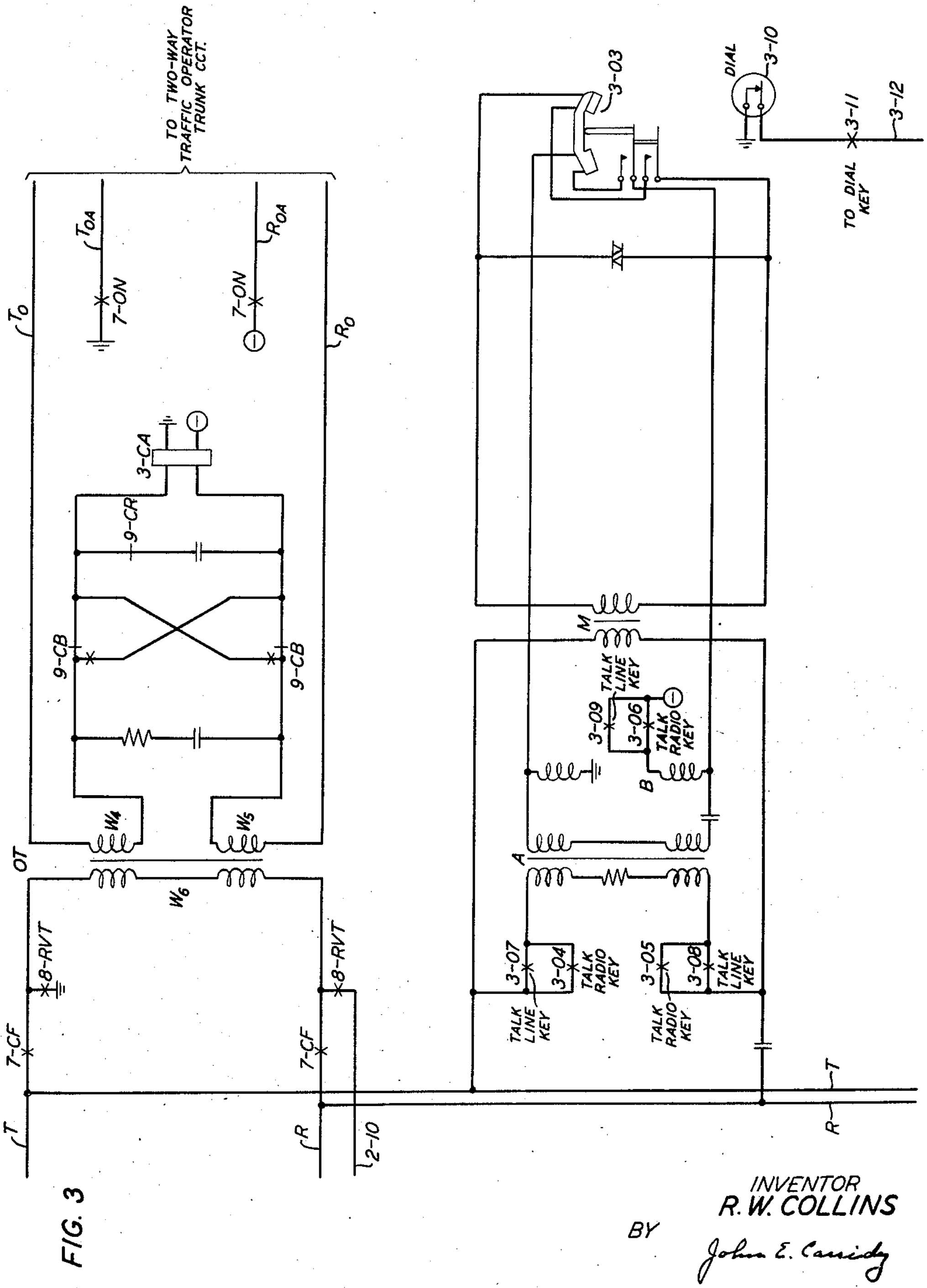
Figure 6:
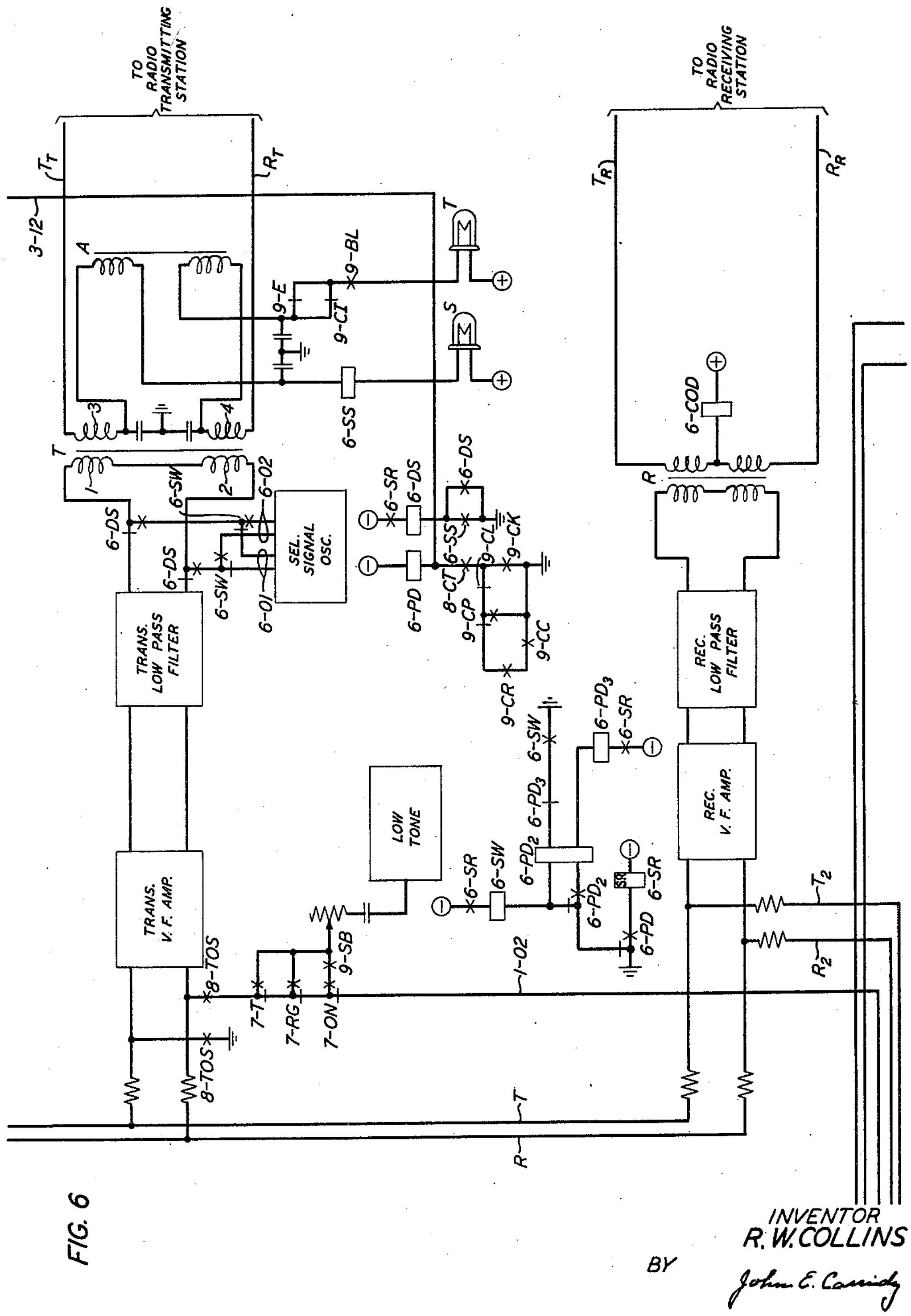

The common equipment comprises a system control circuit shown in Figs. 7, 8, and 9. From the common equipment a circuit extends to the radio transmitting station via bracketed conductor $T_t$ and $R_t$ in the upper right-hand portion of Fig. 6, and to the radio receiving station via bracketed conductors $T_r$ and $R_r$ in the lower right-hand portion of Fig. 6. The telephone circuit in the lower portion of Fig. 3 is the means whereby a technical operator may monitor and communicate through the system for maintenance purposes when required.

The tone generators individual to each dispatcher are shown in the upper portions of Fig. 1 and Fig. 4. Tone generators are well known in the art and are utilized in the present invention to modulate the transmitter carrier, thereby permitting a dispatcher to call his particular fleet.

Each fleet of mobile units is equipped to transmit a common carrier frequency, modulated with a distinctive signal frequence, one distinctive modulating frequency for each fleet, in order to select the particular dispatcher individual to the fleet. When any unit of a mobile fleet initiates a call, the transmitting carrier is modulated with the particular signal frequency individual to the fleet, selectively operating, at the control terminal, an individual tone operated switch for each fleet or dispatcher. Such tone switches are well known in the art and are shown in the lower portion of Fig. 1 and Fig. 4.

As described hereinafter, when any mobile unit calls, a frequency characteristic of its particular fleet is applied to the common input of all of the tone operated switches. The input circuit associated with the tone switches of Figs. 1 and 4 is permanently bridged onto the line incoming from the radio receiving station of Fig. 6 via transformer TR of Fig. 7. This path may be traced from the output of the receiver amplifier of Fig. 6 over conductors $T_2$ and $R_2$ across the input winding of transformer TR in Fig. 7. The output of transformer TR is applied in parallel to the input of each tone-operated switch via lead 7–01. A particular one of these tone operated switches will respond to the particular tone sent by any unit of any mobile fleet. This will operate the relay such as relay 1–$K_5$ or 4–$K_1$ shown at the right of the switches of Figs. 1 and 4, to effect selection of the particular dispatcher individual to the fleet.

The sequence circuit which registers "calls waiting" is common to the system but comprises relays such as 5–$P_1$ and 5–$C_1$ and 2–$P_5$ and 2–$C_5$, shown in Figs. 5 and 2 respectively, which are individual to each dispatcher's control circuit.

The circuit of the present invention provides the tone sending and receiving equipment, selective signaling equipment and control facilities required by the dispatchers and the traffic operator for shared use of a base radio station for both direct dispatch service and urban mobile traffic. In the embodiment described herein there are five dispatchers' control circuits, each with its associated tone receiving and sending equipment in addition to the sequence signaling equipment required by the traffic operator. Figs. 4 and 5 show the circuitry associated with the first dispatcher's station and the relays and equipment therein are followed by the subscript 1 to indicate their association with the first dispatcher's station. Figs. 1 and 2 show the equipment associated with the dispatcher's station 5 and it is to be understood that there would be intermediate stations between stations 1 and 5 as indicated in the drawings by suggested connections. The description will be directed to the station 5 as illustrative of operation at other stations, and for the convenience of description, the subscript 5 will not be utilized in referring to the relays and equipments of Figs. 1 and 2. In addition, the system control circuit provides the facilities which perform the common control functions and this equipment, in general, is shown in Figs. 7, 8 and 9. It is to be understood that if more than five dispatchers are to be served by the control circuit of this invention, it would be necessary to provide auxiliary dispatcher control circuits and the capacity could increase in the magnitude of 15 dispatcher units.

The operation of the system will now be described in detail.

*Outgoing call by dispatcher—System idle*

If the system is idle the control terminal recognizes an "off-hook" signal from a dispatcher and connects his line to the base radio station. The transmitter carrier is turned on and the associated mobile fleet unit channel identification tone is transmitted for approximately 750 milliseconds. This tone is bridged on the line to the radio transmitter in order that it may also be heard by the dispatcher to prevent his attempting to talk before the tone signaling period is completed. The control circuits associated with the dispatcher's line assign this call into a sequence selection circuit which automatically locks out all other dispatchers and the traffic operator and bridges a busy tone on their lines as an indication that the system is in use. The tone switches associated with the several dispatchers are also disabled to discourage any mobile units from attempting to complete calls while the dispatcher is talking. An elapsed time meter associated with the dispatcher is activated to measure the cumulative time the dispatcher is connected to the system and an associated recorder unit is also activated to provide a printed time of day record. Since the transmission of the mobile unit channel identification tone turns on the loudspeakers of all of the mobile units associated with the dispatcher making the call, it is necessary to turn off these loudspeakers after the desired mobile unit has been voice called. When the called mobile unit operator answers by transmitting carrier, the radio receiver responds to this incoming carrier to momentarily interrupt the base station transmitter carrier thus disabling the radio receivers of all of the mobile unit fleet with the exception of the particular unit which has removed his handset to answer the call.

At the end of the call when the dispatcher hangs up, the "on-hook" supervisory signal turns off the transmitter, disconnects the dispatcher from the sequence selector circuit, disconnects the elapsed time meter and recorder and activates the tone receivers to prepare for the next call.

When the system is idle a circuit may be traced from negative battery, through the bottom winding of relay 2–L in Fig. 2, winding $W_1$, of repeating coil $D_5$ over conductor 2–15 through break contacts 1–R, Fig. 1, to the distant dispatcher's telephone circuit via conductor $R_5$ and returning over conductor $T_5$ through a break contact of relay 1–R, conductor 1–04 through winding $W_2$ of repeating coil $D_5$ and the top winding of relay 2–L to ground.

When a call is originated by a dispatcher, the 2–L relay operates from the "off-hook" signal which completes the operating path previously traced. The operation of relay 2–L initiates a sequence of operations including the energization of relays 2–LA, 1–LB and 2–P as well as elapsed time meter 2–16 of Fig. 2 and recorder 9–03 of Fig. 9. The operating path for relay 2–LA is traced from ground through make contact 2–L, break contact 2–RV, the winding of relay 2–LA, a break contact 2–LA, conductor 2–02 and break contact 6–SS, Fig. 8, to negative battery and relay 2–LA locks via make contact 2–LA to battery. The operating path for relay 1–LB in Fig. 1 is traced from negative battery through the winding of relay 1–LB through make contact 2–LA to ground. The operating path for relay 2–P in Fig. 2 is traced from ground, through make contact 2–LA, the winding of relay 2–P, break contact 2–P, over conductor 2–03 and through break contact 8–CT, Fig. 8, break contacts 8–V, 7–S and 8–RN and the normally closed contacts of key 8–09 to negative battery, and relay 2–P locks to battery via make contact 2–P. Elapsed time meter 2–16 is energized through the closed make contacts 2–LA and conductor pair 2–04 to an alternating current source, Fig. 9, actuating time meter 2–16 to register the time the dispatcher is connected to the system in a manner well known in the art. Ground is selectively applied to recorder 9–03 via make contact 2–LA in conductor 2–05, which is individual to the dispatcher, providing a printed time-of-day record, in a manner well known in the art.

Relay 2–P operated completes an operating path for relay 9–BL from ground, via make contacts 2–P and 2–LA, Fig. 2, over conductor 2–06 through the winding of relay 9–BL to negative battery through normally closed contacts 9–01 of the "talk line" key, energizing the transmitter busy lamp, Fig. 9, via make contact 9–BL. Relay 9–BL operated applies positive battery via lamp T, Fig. 6, make contact 9–BL, break contact 9–CI, or 9–E in shunt thereto, a winding of inductance coil A, winding 4 of repeating coil T and conductor $R_T$ to the radio transmitting station where the circuit extends to the winding of the transmitter plate control relay, not shown, to operate the relay and turn on the transmitter carrier. Relay 9–BL also operates to apply energizing ground to recorder 9–03 to activate the recorder, providing a record of the carrier radiation.

Returning now to relay 2–L operated, a path is completed from negative battery via contacts 9–01, Fig. 9, the winding of relay 9–TOA, conductor 2–12, break contact 2–C, Fig. 2, break contact 2–RV and make contact 2–L to ground operating relay 9–TOA which locks to ground via make contact 9–TOA, break contact 6–SS, or 8–TOS in shunt thereto, conductor 2–13 and the above-mentioned make contact 2–L in the operating path of relay 9–TOA. Relay 9–TOA completes the operating path for slow-to-release relay 9–TOB via make contact 9–TOA. Relay 9–TOB in turn closes the operating circuit for slow-to-release relay 9–TOC. Relay 9–TOC completes the energizing path for relay 8–TOS via make contact 9–TOC and relay 8–TOS, in turn, opens one of the previously described locking paths for relay 9–TOA via break contact 8–TOS.

The operation of relay 1–LB extends conductors T and R from across the transmitting and receiving amplifiers, Fig. 6, to across winding $W_3$ of repeating coil $D_5$, Fig. 2, via make contacts 1–LB, thereby to connect the dispatcher's line circuit, over conductors $T_5$ and 1–04 and $R_5$ and 2–15 into the radio stations by way of repeating coil $D_5$. In addition, relay 1–LB operated removes ground applied to the grid of the right-hand tube of the tone generator, Fig. 1, via break contacts 1–LB and 2–MV and extends the grid lead over conductor 1–01 via make contact 1–LB and thence to ground via break contact 8–TOS, Fig. 7. The previously described operation of relay 8–TOS thus removes ground from conductor 1–01 activating the tone generator associated with the calling dispatcher. With relays 1–LB and 8–TOS operated, the output of the tone generator of Fig. 1 is bridged across the input of the transmitting amplifier via make contact 1–LB in conductor 1–02, break contact 7–ON, Fig. 6, break contact 7–RG, break contact 7–T, make contact 8–TOS, across the input of the transmitting amplifier and thence to ground via make contact 8–TOS. Relay 7–MD is also energized over conductor 1–03 by way of make contact 1–LB in Fig. 1 and functions to disable the tone switches as will be subsequently described.

Returning now to relay 2–P operated, an operating path for relay 2–C is completed from ground over conductor 2–11 via break contact 8–B, Fig. 8, the break contacts of the P relays, individual to the other dispatchers, in conductor 2–11, make contact 2–P, Fig. 2, the winding of relay 2–C, conductor 2–14, break contacts 8–V, 7–S, and 8–RN, Fig. 8, and key 8–09 to battery and relay 2–C operated locks relay 1–LB to ground via make contacts 1–LB and 2–C. Relay 8–A is energized from ground over conductor 2–07 via make contact 2–P, Fig. 2, the winding of relay 8–A and break contact 8–B to negative battery and locks to battery via make contact 8–A. Relay 8–A operated shunts break contact 8–B in the operating path for relay 2–C via make contact 8–A. Slow-to-release relay 8–B is energized via make contact 8–A. Relay 8–RVT is energized via make contact 8–A and break contact 8–CT. In addition, relay 8–A operated extends ground to conductor 2–08, via make contact 8–A, Fig. 8, and conductor 2–08 extends to negative battery via the break contacts of the C relays and the windings of the RV relays associated with all but the calling dispatcher insofar as the operating path of relay 2–RV is open at break contact 2–C, Fig. 2. The RV relays operate to apply the busy tone source, Fig. 8, to conductor 2–10 and then via the make contacts of the RV relays across a winding of the D repeating coils and to ground via make contacts of the RV relays thereby to apply busy tone to all dispatchers' lines other than the dispatcher making the call. Relay 8–RVT operates to bridge the busy tone on conductor 2–10 across the winding of repeating coil OT, Fig. 3, via make contacts 8–RVT thereby to apply busy tone to the two-way operator's trunk circuit. Accordingly, other dispatchers and the two-way operator are advised that the system is busy.

When the radio transmitting station is radiating power, its monitor relay, not shown, applies ground to conductor $T_T$ and the circuit is extended through winding 3 of repeating coil T, a winding of inductance coil A, the winding of relay 6–SS and then via lamp S to positive battery. Relay 6–SS operated opens the remaining locking path of relay 9–TOA which releases. Relays 9–TOB, 9–TOC and 8–TOS, in turn, release. Relay 8–TOS released disconnects the tone generator from the transmitter amplifier and reapplies ground to conductor 1–01 via break contact 8–TOS, Fig. 8, applying ground to the grid of the extreme right tube of the tone generator, as seen in Fig. 1, and thus de-activating the tone generator.

Summarizing the foregoing, it is to be noted that the audio frequency tone used to signal the mobile units is a discrete frequency for each dispatcher's mobile unit fleet and each tone generator must have its output connected to the radio transmitter line by the operation of relays 8–TOS and LB. This tone must be transmitted for at least 500 milliseconds after the transmitter is radiating carrier. This time interval is determined by the combined release times of relays 9–TOB and 9–TOC. When operated, relay 9–TOA locks to a break contact of relay 6–SS to insure the starting of the timing period after the transmitter is radiating carrier. Relay 9–TOA also has a locking path to a break contact of relay 9–TOS to insure a complete cycle of the tone control chain operation in the event relay 6–SS operates before all the chain relays. Since the tone can be transmitted for a maximum of one second (assuming maximum release times of relays 9–TOB and 9–TOC) after the response to the "off hook" supervisory signal, it is bridged on the transmitter line ahead of the transmitter amplifier in Fig. 6. Thus the tone is permitted to be heard by the dispatcher at a reduced level to advise him when the signaling period is complete. It is also to be noted that relay 2–RV which locks out the dispatcher whenever the system is in use, has its control ground connected through the break contacts of relay 2–C to prevent its operation whenever a dispatcher is connected into the system. Relays 2–P, 2–C, 8–A and 8–B, in addition to performing the function herein above described, comprise the sequence selection circuit that determines the order in which the "calls waiting" which may be registered while the dispatcher or traffic operator is connected to the control terminal will be assigned. Their sequence functions are described hereinafter.

It should also be noted that relay 9–BL, whose operation was previously discussed, closes its associated make contact in Fig. 6 to initiate radiation of transmitter carrier. The positive battery applied to the ring side of the transmitter line through make contact 9–BL to turn on the transmitter carrier, is connected through a lamp T to dampen the transients caused by the charging currents associated with the composite set of condensers TB and RB. This battery is also connected through the break contacts of relays 9–E and 9–CI to provide a momentary carrier interruption when a mobile unit answers the call to reset the squelches of all the mobile units in the associated fleet not involved in the call. When relay 9–BL operates, it operates relay 9–D via make contact 9–BL and break contact 9–E and relay 9–D, in turn, operates relay 9–CI thereby to open up one of the parallel operating paths for the transmitter plate relay. This prepares the interruption of the carrier radiation, as described hereinafter.

The selectors in the fleet of mobile units individual to the calling dispatcher function, in response to the tone modulated carrier, to open the squelch circuits of the mobile unit receivers and "key on" the associated loudspeakers. Suitable squelch circuits are well known in the art. The dispatcher then designates the particular mobile unit or units by voice and the mobile unit answers by removing the handset and momentarily operating the push-to-talk button. This transmits a burst of carrier from the mobile unit. In response to this a relay, not shown but well known in the art as a codan relay, associated with the radio receiver is momentarily operated establishing a circuit from ground over conductors $T_r$ and $R_r$ in parallel, Fig. 6, the coils of repeating coil R and the winding of relay 6–COD to positive battery. Relay 6–COD while operated completes an energizing path for relay 9–E via make contact 6–COD and break contacts 8–PT, 8–RN and 7–T and relay 9–E locks via make contact 9–E and make contact 9–BL. Relay 9–E opens its associated break contact in Fig. 6 which opens the remaining parallel operating path for the transmitter plate relay thereby to turn off the transmitter carrier. Operated relay 9–E also opens the operating path for slow-to-release relay 9–D which releases and in turn releases relay 9–CI which restores the operating path for the plate relay through its break contact in Fig. 6. Thus the transmitter carrier is interrupted for the combined release time of the slow-to-release 9–D and 9–CI relays which release time may be approximately 400 milliseconds.

Accordingly, the transmission of the mobile unit channel identification tone turns on the loudspeakers of all the mobile units associated with the dispatcher making the call, the receiving codan relay in responding to the incoming carrier momentarily interrupts the base station transmitter thereby to disable all mobile unit radio receivers with the exception of the unit which removed its handset to answer the call. This receiver is not affected because the squelch circuit is disconnected by the removal of the handset from its hanger.

At the conclusion of the call, the mobile unit push-to-talk button is released and relay 6–COD is released. The dispatcher replaces his handset releasing relay 2–L which, in turn, releases relay 2–LA. Relay 2–LA released releases relay 2–P which, in turn, releases relays 9–BL, 8–A and 2–C. Relay 9–BL released releases relay 9–E and turns off the transmitting carrier, thereby releasing relay 6–SS. Relay 8–A released releases relays 8–B, 8–RVT and the RV relays of the other dispatchers removing the busy tone from the lines of the other dispatchers and the two-way traffic operator.

*Incoming call from a dispatcher mobile unit—System idle*

Mobile units can complete calls only when the system is not in use although they may register "calls waiting" during an enforced idle period as subsequently described. After ascertaining that the control terminal is idle, the mobile unit originates a call by turning on his transmitter carrier and modulating it with a short burst of channel identification tone. Each fleet is assigned a different individual audio frequency tone. This tone is received by the control terminal and actuates the associated tone switch. This function connects the dispatcher control circuit into the control terminal and rings the associated dispatcher's bell with a ringing signal having a one-second ringing interval and a one-second silent interval. It also turns on the base radio station carrier and modulates it with low tone during each ringing interval as an audible ring signal to the mobile unit. When the dispatcher answers the call, the functions of the control terminal are the same as in a call originated by him when the system is idle except that no mobile unit channel identification tone is transmitted. At the end of the call in progress, the "on-hook" signal from the dispatcher restores the control terminal to its idle circuit condition.

When the system is idle, the tone switches of Figs. 1 and 4 are bridged across the line to the radio receiver and are conditioned to respond to incoming signals. This bridging path extends from the tone receivers of Figs. 1 and 4 over conductor 7–01 through the transformer TR output winding, Fig. 7, the input winding of transformer TR over conductors R2 and T2 to the output of the radio receiving amplifier of Fig. 6. A dispatcher mobile unit originates a call by transmitting a burst of carrier modulated with the associated channel identification tone. The incoming carrier signal operates relay 6–COD as well as relay 9–E as previously described. However, in this instant no useful purpose is served as was the case with the call originated by the dispatcher when carrier was momentarily interrupted to disconnect the uncalled mobile units.

The incoming tone actuates the tone switch over conductors R2 and T2, associated with the fleet dispatcher and assuming that the selector tone receiver is that one shown in Fig. 1, its associated 1–K relay operates to close the operating path of relay 2–MR if the system is idle and relay 7–MD is released. This path is traced from negative battery through the winding of relay 2–MR, conductor 2–01, make contact 1–K, Fig. 1, conductor 1–10 and break contact 7–MD, Fig. 7, to ground. Relay 2–MR locks to ground via make contact 2–MR, break contacts 2–LA and 2–C, conductor 2–17 and busy key 8–10, Fig. 8. Relay 2–MR operated extends ground to the winding of relay 2–P via make contact 2–MR and since, as previously described, battery is applied to the other side of the winding via conductor 2–03, relay 2–P operates and locks to battery in the same manner as previously described. Relay 2–P in operating closes its make contact to complete the previously described operating circuit for relay 2–C extending from ground in Fig. 8 through the break contact 8–B over conductor 2–11 and the break contacts of the P relays in conductor 2–11 associated with the other dispatchers, through make contact 2–P and the winding of relay 2–C over conductor 2–14 through the closed break contacts of relays 8–V, 7–S and 8–RN and key 8–09 to negative battery in Fig. 8. Operated relay 2–C closes its associated make contact in the operating path of relay 1–R completing a path from ground via make contact 2–C, break contacts 2–LA, 1–LB and 1–TP, the winding of relay 1–R, break contact 1–R, conductor 1–11 and break contact 6–SS, Fig. 7, to negative battery operating relay 1–R which locks to battery via make contact 1–R. In addition, relay 2–C operated provides a locking path to ground for relay 2–MR via make contact 2–MR, Fig. 2, break contact 2–LA, make contact 2–C, conductor 2–18, break contact 7–NA, Fig. 8, and the normally closed contact 8–10 of the busy key and relay 2–MR is maintained operated until the subsequent operation of relay 2–LA.

Relay 1–R operates to apply ground to conductor 2–06 via make contact 1–R, Fig. 2, and to conductor 8–03 via make contact 1–R, Fig. 2, operating relays 9–BL and 8–TOS as previously described. Relay 9–BL operates to turn on the transmitter carrier, as described above, whereupon relay 6–SS operates. In addition, relay 1–R operated extends ground to conductor $T_5$, extends conductor $R_5$ to conductor 1–05 by way of make contact 1–R and a winding of relay 1–TP and extends conductor 1–05 to conductor 1–06 by way of make contact 1–R and make contact 2–MR. Conductor 1–06 extends to negative battery via break contacts 9–SB, Fig. 7.

In order to provide an indication that the call is incoming from a mobile unit, a ringing signal having a one-second ringing interval and a one-second silent interval is used to ring the dispatcher's bell. This signal is obtained from the relay combination consisting of relays 9–SA, 9–SB and 9–SC. A circuit from interrupter 8–04, shown in Fig. 8, extends over conductor 8–06, through closed make contacts 1–R and 2–MR in Fig. 2, over conductors 8–01 and 8–02, through break contact 9–SA, Fig. 9, and the winding of relay 9–SB to negative battery. Thus the first ground pulse from interrupter 8–04 operates relay 9–SB through a break contact of relay 9–SA. Relay 9–SB connects ground to the primary winding of relay 9–SA through the closed make contact of relay 8–TOS and the break contact of relay 9–SC. However, relay 9–SA does not operate at this time because ground is connected to both sides of the primary winding. At the end of the first pulsing ground from interrupter 8–04, current flows through the primary winding of relay 9–SA and the winding of relay 9–SB operating relay 9–SA and holding relay 9–SB operated. Relay 9–SB is slow-to-release to prevent its release when the current through its winding is reduced. With relay 9–SA operated, the second ground pulse is applied from conductor 8–02 through make contact 9–SA, the secondary winding of relay 9–SA and the winding of relay 9–SC holding relay 9–SA operated and operating relay 9–SC which, in turn, opens the current path for relay 9–SB and relay 9–SB releases. At the end of the second ground pulse both relays 9–SA and 9–SC are released. A.C.-D.C. ringing generator 7–02 is connected through a make contact of relay 9–SB in Fig. 7 via conductor 1–06, make contacts 2–MR and 1–R, the winding of relay 1–TP and make contact 1–R to conductor $R_5$ to provide the desired ringing signal to the dispatcher's line. When relay 9–SB is released, negative battery is connected to conductor 1–06 via break contact 9–SB in order to produce D.-C. during both ringing and silent intervals for tripping purposes. This ringing signal is applied to the dispatcher's line through the primary winding of relay 1–TP which operates on D.-C. only. Thus, when the call is answered by the dispatcher, relay 1–TP will operate either during the ringing or silent interval.

When relay 1–TP operates it opens the circuit of relay 1–R which releases and in turn opens its associated make contact to disconnect the ringing circuit. Relay 1–TP, in operating, locks through break contacts 1–LB and 2–LA and make contact of relay 2–C, previously operated, and will remain in this locked condition until the operation of relay 2–LA permits its release.

The ringing signal just discussed is bridged over conductor 1–05 to relay 7–RG and its associated varistor through condenser L. During each ringing interval the varistor permits a pulsing D.-C. current to flow through relay 7–RG and this latter relay operates during the ringing interval to connect the "low-tone" equipment of Fig. 6 to the radio transmitter line through the make contact of relay 7–RG and the make contact of relay 8–TOS. This tone is thus transmitted to the calling mobile unit to indicate that the called dispatcher's line is being rung.

It should also be noted that, as described heretofore, the operation of relay 2–P permits the operation of relay 8–A which in turn operates relays RV associated with other dispatchers and relay 8–RVT, thereby to bridge a busy tone on all dispatchers not called and to the traffic operator's line. Relay 8–A also operates relay 8–B.

When the call is answered by the dispatcher, it progresses in the same manner as a call originated by him with the following exceptions. Before the dispatcher is connected to the control terminal, it is necessary to interrupt the base station transmitter carrier to insure the disabling of all mobile unit radio receivers not involved in the call. When relay 1–R releases, after the dispatcher answers the call, it allows relay 2–L to operate in the same manner as previously described. Released relay 1–R also releases relay 8–TOS and opens the operating path of relay 9–BL thereby to release relay 9–BL which, in releasing, turns off the transmitter carrier thereby releasing relay 6–SS. When relay 2–L operates, it connects ground to the winding of relay 2–LA. Relay 2–LA then operates when battery is supplied by the release of relay 6–SS to conductor 2–02 via make contact 6–SS, Fig. 8, followed by the operation of relay 1–LB to connect the dispatcher into the system. Relay 2–LA also reoperates relay 9–BL, as described above, turning on the transmitter carrier, reoperating relay 6–SS.

Since the call is incoming from a mobile unit, it is not necessary to transmit the mobile unit identification tone to turn on the loudspeakers of the fleet. Since relay 2–C is operated, the energizing path for relay 9–TOA extending over conductor 2–12 is not completed. Thus as relay 9–TOA does not operate, relay 8–TOS does not operate and the associated tone generator is not keyed on and the tone is not transmitted, as was described hereinabove.

*Outgoing call originated by traffic operator—System idle*

With the system in an idle condition, the control terminal recognizes a seizure from the traffic operator. The transmitter carrier is turned on and the output of the selective signaling oscillator, Fig. 6, is connected to the transmitting line. Two bursts of audio tone, the first of 600 cycles followed by a 1500-cycle burst, are then transmitted to clear the selectors in the urban mobile units. The traffic operator is assigned into the sequence selection circuit which connects the operator to the radio transmitter and receiver and automatically locks out all of the dispatchers and bridges a busy tone on their lines. The operator is then given a "start dial" or "sender start" signal and the incoming dial pulses from the operator cause the selective signalling oscillator to modulate the outgoing carrier with alternate bursts of 600 and 1500 cycles with 600 cycles transmitted as the first and last pulses. A total of 23 or 25 pulses will be sent for each dialing cycle and upon completion of dialing the control terminal inserts a delay to permit ample time for operation of the called urban unit's call indicator. After this delay the transmitter is modulated with a final burst of 1500 cycles from the selective signaling oscillator to clear the called mobile unit's selector and turn off its call indicator.

When the urban unit answers, the codan relay in the radio receiver causes the operator trunk battery to reverse which gives the operator an indication that the called unit has answered.

When the call is completed and the operator removes her plug, the terminal turns off the transmitters, removes the busy tone from the dispatchers' lines and restores to normal to await the next call.

Referring to Fig. 3, when a call is originated by the traffic operator, relay 3–CA operates from the "plug in" by way of conductor $T_0$, coil $W_4$ of repeating coil OT and break contact 9–CB and by way of conductor $R_0$, coil $W_5$ and break contact 9–CB. Relay 3–CA operates to energize relay 9–CC which closes its make contact in the operating circuit of slow-to-release relay 9–CE. Relay 9–CB operates from ground by way of make contact 9–CE, break contact 9–CJ and the winding of relay 9–CB to negative battery. Relay 9–CH is operated from ground via make contact 9–CE, break contacts 7–CG and 8–RVT, and the winding of relay 9–CH to battery. Relay 8–PT is operated over a path extending from ground through make contact 9–CE through a break contact of relay 8–RVT, the winding of relay 8–PT, the break contact of relay 8–PT, break contacts 8–V, 7–S and 8–RN and the normally closed contacts of key 8–09 to negative battery and locks to battery via make contact 8–PT.

Returning to Fig. 9, relay 9–CH operated completes the operating path for relay 9–CK via make contact 9–CH and break contact 7–CJ. Relay 9–CB operated transfers ground to conductor $R_0$ via relay 3–CA winding, make contacts 9–CB and coil $W_5$ and battery to conductor $T_0$ via relay 3–CA winding, make contacts 9–CB and coil $W_4$, reversing the operator trunk battery preventing dial pulse transmission in a well-known manner. Relay 8–PT operated closes an operating path for relay 8–A from ground through make contact 8–PT, the winding of relay 8–A and break contact 8–B to battery and closes an operating path for relay 8–CT over a path extending from negative battery via key 8–09, break contacts 8–RN, 7–S and 8–V, the winding of relay 8–CT, make contact 8–PT, conductor 8–07, the break contacts of the P relays in conductor 2–11 through make contact 8–A, Fig. 8, to ground. Relay 8–A operated locks to battery, operates relay 8–B and operates the RV relays associated with the dispatchers' control circuits thereby to bridge a busy tone on all dispatchers' lines as described previously. Relays 8–PT and 8–CT in combination with relays 8–A and 8–B comprise the sequence selection circuit for the operator that determines the order in which her "calls waiting" may be registered by her while the circuit is busy and assigned into the terminal for completion as hereinafter described.

Relay 8–CT operated completes the operating path for relay 7–MD which disables the tone switches. Relay 8–CT also operates relay 7–CF which connects conductors T and R across winding $W_6$ of repeating coil OT and supplies energizing ground to recorder 9–03 to actuate the recorder. In addition, relay 8–CT operates to complete an operating path for relay 9–BL from ground via make contacts 9–CE–1 and 8–CT, break contact 7–ON, the winding of relay 9–BL and contacts 9–01 to battery and relay 9–BL, in turn, turns on the transmitter carrier. Since it is not necessary to "voice call" the urban mobile unit, it is unnecessary to momentarily interrupt the transmitter carrier, as in the case of the dispatcher units, to turn off the loudspeakers of the units not involved. When the transmitter carrier is turned on, relay 6–SS operates.

Referring again to Fig. 9, operated relays 9–CK and 9–CH close their make contacts in the operating circuit of relay 9–CL which operates and relays 9–CH and 9–CL, in turn, effects the operation of relay 9–CM. Relays 9–CH and 9–CM operate relay 9–CP which operates to close its associated make contact in the circuit of relay 9–CR which operates and locks via make contacts 9–CR and 9–CH and break contact 7–CS. In addition, relay 9–CP operates to shunt break contact 7–CJ in the operating path for relay 9–CB.

The selectors associated with the receivers in the urban service mobile units respond to alternate bursts of 600 and 1500-cycle tones which are furnished by the selective signaling oscillator of Fig. 6. Tone responsive selectors suitable for use in conjunction with this system are described in Patent 2,020,487, granted to P. W. Wadsworth et al. on November 12, 1935 and Patent 2,064,319, granted to H. M. Pruden on December 15, 1936 which are hereby made part of this disclosure as though fully set forth herein.

Before transmitting the dial pulses, it is necessary to send bursts of 600 and 1500 cycles to insure that the selectors in all mobile units are in a released condition. The operation of relays 9–CK and 8–CT operates relay 6–PD which, in turn, operates slow-to-release relay 6–SR. Relay 6–SR is sufficiently slow to release to remain operated for the duration of a dial pulse.

Relay 6–SR operates to complete an energizing path for relay 6–DS from battery via make contact 6–SR, the winding of relay 6–DS and make contact 6–SS to ground and relay 6–DS locks to ground via its own make contact. Relay 6–DS operates to apply the 600-cycle tone output leads 6–01 of the signal oscillator across repeating coil T via the break contacts of relay 6–SW and the make contacts of relay 6–DS.

With relays 6–SS, 8–CT and 9–CR operated, relay 9–CJ operates and locks via make contacts 9–CJ and 9–CH. Relay 9–CJ operated releases slow-to-release relay 9–CK and relay 9–CK, in turn, releases relay 6–PD. Relay 6–PD released completes an operating path for relay 6–SW from ground via break contact 6–PD, break contact 6–$PD_2$, the winding of relay 6–SW and make contact 6–SR to battery and relay 6–SW locks to ground via the winding of relay 6–$PD_2$, break contact 6–$PD_3$ and make contact 6–SW. Relay 6–SW operates to apply the 1500-cycle tone output leads 6–02 of the signal oscillator across repeating coil T via the make contacts of relays 6–SW and 6–DS. Relay 6–PD also opens the operating path of relay 6–SR but slow-to-release relay 6–SR does not have sufficient time to release, as described hereinafter. In addition, relay 9–CK released opens the operating path of slow-to-release relay 9–CL.

When relay 9–CL releases, ground is reapplied to the winding of relay 6–PD via make contact 9–CP, break contact 9–CL and make contact 8–CT. Relay 6–PD operates to reclose the operating path of relay 6–SR before it releases and removes shunting ground from the winding of relay 6–$PD_2$ via break contacts 6–PD and 6–$PD_2$ whereupon relay 6–$PD_2$ operates due to the energizing path from ground via make contact 6–SW, break contact 6–$PD_3$, the winding of relay 6–$PD_2$, the winding of relay 6–SW and make contact 6–SR to battery. Relay 6–SW is maintained operated and 1500-cycle tone is thereby still applied to the radio transmitter. In addition, the release of relay 9–CL releases relay 9–CM which, in turn, releases relay 9–CP. Relay 9–CP released transfers the ground applied to the winding of relay 6–PD via make contacts 9–CP to a path via make contacts 9–CC and 9–CR and break contact 9–CP. Relay 9–CP also releases relay 9–CB which, in turn, restores the traffic operator's trunk circuit to normal polarity to give the operator a "start dial" signal. The oscillator has thus sent 600 and 1500 cycles to clear the mobile unit selectors and is conditioned to send 600 cycles as the first dial pulse.

Each call will preferably consist of four digits totaling 23 or 25 pulses beginning and ending with 600 cycles. Upon completion of the dialing cycle, a delay of approximately 4.5 seconds is provided to permit the call indicators in the mobile units to operate. After this delay, a final tone of 1500 cycles is sent to clear the mobile unit selectors and turn off his call indicator after which the signaling oscillator is disabled and conductors R and T are connected across coil T and thence to the radio transmitter.

As the operator begins dialing, the first "dial" or open pulse releases relay 3–CA which, in turn, releases relay 9–CC. Relay 9–CC releases to open the operating path of relay 6–PD. Relay 9–CC in releasing also closes its associated break contact in the circuit of relay 9–CO which relay operates due to the prior operation of relay 9–CR and locks via make contacts 9–CR and 9–CO.

At the end of each dial pulse, relays 3–CA and 9–CC operate reclosing the operating path of relay 6–PD. With relays 9–CR, 9–CC and 9–CO operated, ground is removed from the plate and control electrodes of tube $V_4$, Fig. 7, positive battery is applied to the plate of tube $V_4$ via make contact 9–CO and capacitor 7–14 starts charging from positive battery via make contact 9–CO and resistor $R_{14}$, thereby to begin the timing cycle of tube $V_4$. At the beginning of each dial pulse relays 3–CA and 9–CC release to discharge capacitor 7–14 to ground via resistor $R_{16}$, make contacts 9–CR and 9–CO and break contact 9–CC to cause recycling of the timing circuit of tube $V_4$.

The release of relay 6–PD in response to the start of each odd numbered dialing pulse, including the first dialing pulse, completes a path from ground via break contact 6–PD, make contact 6–$PD_2$, a winding of relay 6–$PD_2$, the winding of relay 6–$PD_3$ and make contact 6–SR to battery operating relay 6–$PD_3$ and maintaining relay 6–$PD_2$ operated. Relay 6–$PD_3$ operates to open the locking path of relay 6–SW and relay 6–SW released reapplies the 600-cycle tone to the radio transmitter. The operation of relay 6–PD in response to the termination of each odd numbered dialing pulse opens the operating paths of relays 6–$PD_2$ and 6–$PD_3$ releasing the relays. The signaling oscillator thus sends 600-cycle tone for each odd numbered dialing pulse.

The release of relay 6–PD in response to the start of each even numbered dialing pulse, including the second dialing pulse, completes the previously described operating path for relay 6–SW which, in turn, reapplies the 1500-cycle tone to the radio transmitter. The operation of relay 6–PD in response to the termination of each even numbered dialing pulse removes shunting ground from the winding of relay 6–$PD_2$ and the relay operates as previously described. The selective signal oscillator thus sends 1500-cycle tone for each even numbered dialing pulse.

This pattern continues until completion of a dialing period of 23 or 25 pulses whereby the selective signaling oscillator sends alternate bursts of 600 and 1500 cycles for dial pulses concluding with the 600-cycle tone.

When the operator completes her dialing, relays 3–CA and 3–CC are operated and the final selector signal oscillator pulse of the frequency of 600 cycles is transmitted. At this point, the tube $V_4$ timing circuit begins timing out and, after approximately 4.5 seconds delay time to permit the mobile unit calling indicator to operate, tube $V_4$ conducts to energize associate relay 7–CS. Relay 7C–S opens its normally closed contact in the operating circuit of relay 9–CR which releases and, in turn, releases relay 9–CO disabling the timing circuit of tube $V_4$ extinguishing the tube and releasing relay 7–CS. With relay 9–CR released, ground is removed from the winding of relay 6–PD which releases to reoperate relay 6–SW and open the operating path of slow-to-release relay 6–SR and the selective signaling oscillator sends the final 1500-cycle tone to clear the mobile unit selector. When relay 6–SR releases, relay 6–DS releases, the oscillator output is opened, and the radio transmitter is reconnected to the operator's talk path.

The urban unit answers the call by operating the push-to-talk button operating relay 6–COD. Relay 6–COD completes a path from battery via the winding of relay 9–CD, make contact 9–CH, break contact 8–RVT and make contact 6–COD and relay 9–CD locks to ground via make contacts 9–CH and 9–CD. Relay 9–CD applies ground to the winding of relay 9–CB via make contacts 9–CE and 9–CD and break contact 9–CR and relay 9–CB operates to reverse the traffic operator's trunk battery indicating that the urban unit has answered.

At the completion of the call, the urban push-to-talk button is released releasing relay 6–COD. The traffic operator removes her cord releasing relay 3–CA which, in turn, releases relays 9–CC and slow-to-release relay 9–CE. Relay 9–CE releases relays 9–CH, 8–PT and 9–CB which restores the operator trunk battery to normal. Relay 9–CH releases relay 9–CD. Relay 8–PT releases relays 8–CT and 8–A. Relay 8–A releases relays 8–B and the RV relays which remove the busy tone from the dispatchers' lines. Relay 8–CT releases relays 7–CF, 9–BL and 7–MD enabling the tone switches. Relay 9–BL turns off the transmitting carrier releasing relay 6–SS which, in turn, releases relay 9–CJ.

*Incoming call originated by urban service mobile unit—System idle*

As in the case of the dispatcher mobile units, urban telephone mobile units can register calls only when the system is not in use although a "call waiting" may be registered by dispatcher units during an enforced idle period as described below. After ascertaining that the circuit is idle, the mobile unit operator originates a call by turning on his transmitter carrier through operation of his push-to-talk button. The codan relay in the radio receiver causes the call to be assigned into the sequence circuit, busies out all dispatchers' lines, and reverses battery polarity on the operator trunk circuit to give the operator a visual calling signal.

When the system is idle, the urban service mobile unit initiates a call by operating his push-to-talk button and transmitting carrier. The relay 6–COD is operated and releases the normally operated slow-to-release relay 8–MI by opening the locking path via make contact 6–MI and break contact 6–COD.

It is noted that ground is applied to the winding of relay 8–MI via make contact 8–RVT when the dispatcher calls a fleet unit and via make contacts 8–CT and 9–CE when the traffic operator calls an urban unit. In addition, when a fleet unit calls and operates relay 6–COD, ground is applied to the winding of relay 8–MI via a make contact of an MR relay associated with a dispatcher's control circuit, conductor 8–05 and make contact 8–MI whereby slow-to-release relay 8–MI is maintained operated until released by an urban unit call.

Relay 8–MI in releasing applies ground to the winding of relay 8–PT via break contact 8–MI. Relay 8–PT operates to operate relays 8–A, 8–B and the RV relays of the dispatchers' circuits to apply busy tone to all dispatchers' lines as previously described. Operated relay 8–PT also completes the previously described operating circuit of relay 8–CT which, in turn, operates relay 7–CF. Relay 7–CF on operating connects the traffic operator's trunk line to the transmission circuit as previously described. The release of relay 8–MI also completes a path from battery via the winding of relay 7–CG and break contacts 8–RVT and 8–MI to ground and relay 7–CG, in turn, effects the operation of relay 9–CB which reverses the battery polarity of the traffic operator's trunk circuit to signal the 2-way operator.

When the traffic operator plugs in to answer her call, relay 3–CA is operated and, in turn, operates relays 9–CC and 9–CE. Relay 9–CE operates to energize relay 9–BL as previously described and relay 9–BL operated turns on the transmitter carrier operating relay 6–SS. In addition, relay 9–CE operates to complete a locking path for relay 7–CG via make contacts 9–CE and 7–CG and to reclose an operating path for relay 8–MI via make contacts 8–CT and 9–CE. When the mobile unit releases its push-to-talk button, relay 6–COD releases recompleting the previously described locking path for relay 8–MI.

When the call is complete, the traffic operator removes her plug to terminate the connection, releasing relays 3–CA, 9–CC and 9–CE, thereby to effect the release of relays 8–PT, 7–CG and 9–BL which turns off the transmitter carrier, releasing relay 6–SS. Relay 7–CG releases relay 9–CB which restores the battery on the operator trunk circuit to normal. Relay 8–PT releases relays 8–A and 8–CT which, in turn releases relay 7–CF. Relay 8–A releases relays 8–B and the RV relays which remove the busy tone from the dispatchers' circuits.

Summarizing, the operated 6–COD relay releases the normally operated 8–MI relay which actuates circuits to apply a busy signal to the dispatcher circuits, reverse the polarity on the operator's two-way trunk and connect the operator's trunk to the transmitting line. When the traffic operator answers the call, the transmitter is turned on and the circuit is in a talking condition. A calling dispatcher mobile unit also operates the 6–COD relay but the slow-releasing 8–MI relay is prevented from releasing at that time by the operation of an MR relay which is associated with the selected tone receiver. Succeding operations of the urban and fleet mobile units push-to-talk button during a call have no effect on relay 8–MI which is maintained operated via the make contacts of relays 8–CT and 9–CE or 8–RVT.

*"Call waiting" registration by dispatcher or traffic operator—System Busy*

Whenever the control terminal is in use, busy tone is bridged on all the dispatchers' lines not involved in the call in progress and on the traffic operator's line unless it is involved as an indication to them that the system is in use. If any of these dispatchers or the traffic operator attempts to make a call, the off-hook signal will automatically register into the control terminal the fact that they desire to originate a call when the system is available. This "call waiting" is assigned into the channel sequence selection circuit and their call preference in the system is dependent on their associated channel number and not necessarily in the order that the waiting calls were registered. When the control terminal is available for their use, a ringing tone with a two-second ring interval and a four-second silent interval is used to ring the dispatcher's bell. The traffic operator will receive a supervisory signal (lighting of line lamp) on an auxiliary operator trunk associated with her position for the same purpose. These signals indicate that the call is in answer to their request to make a call and not an incoming call from a mobile unit. The signal is applied to the dispatcher's or operator's line after the radio transmitter carrier is turned off to make sure that all mobile unit radio receivers are disabled. When the call is answered by the dispatcher or traffic operator, the control terminal functions in the same manner as an outgoing call made by them with the system idle. Since the mobile receivers associated with each dispatcher and the traffic operator are disabled, it is necessary to turn them on when they answer the call in the same manner as they would if the call had originated by them when the system is not in use.

Under busy circuit conditions all parties normally having access to the circuit are locked out except the party initiating the call in progress as previously described. The RV relays are operated for each dispatcher not using the circuit and the 8–RVT relay is operated in case the traffic operator is not using the circuit. When one of the dispatchers or the traffic operator attempts to make a call under these conditions, they will hear busy tone as an indication the system is in use and their respective "off-hook" and "seizure" signals register their request for their waiting call. When the system becomes idle, they are then assigned into the circuit to make the call.

The dispatcher "off-hook" signal operates his L relay, for example relay 2–L, as previously described. With relay 2–RV operated, an operating path for relay 2–CW is completed from battery via the winding of relay 2–CW, make contact 2–RV and make contact 2–L to ground and relay 2–CW locks to ground by way of make contact 2–CW, break contact 2–LA, break contact 2–C, conductor 2–17 and the normally closed contact of busy key 8–10. When the dispatcher hangs up after finding the circuit busy, relay 2–L releases but relay 2–CW remains locked.

Since the traffic operator or another dispatcher is using the circuit relay 9–CE for the LA relay of another dispatcher is operated and battery is applied to conductor 8–11 by way of make contact 9–CE, Fig. 8, or the make contact of the operated LA relay as for example make contact 5–LA, Fig. 5. Conductor 8–11 is connected to ground by way of the winding of relay 8–V, conductor 8–12, make contact 2–CW, Fig. 2, and make contact 2–RV operating relay 8–V. Relay 8–V operates to complete the operating path for relay 7–S which locks to ground by way of make contact 7–S and break contact 7–U. Relay 7–S operated completes a holding path for relay 8–A by way of make contact 7–S and relay 8–A which is operated while the circuit is busy is maintained operated by relay 7–S. Relay 2–CW operated places ground on the winding of relay 2–P by way of make contact 2–CW.

When the system becomes idle, relay 8–CE or the busy dispatcher's relay LA releases and, as subsequently described in detail, relay 8–V releases operating relay 7–T which operates relay 8–BS. Relay 7–T in turn effects the operation of relay 7–U whereupon relays 7–S, 7–T and 7–U release. Relay 8–BS locks via make contact 8–BS, break contact 7–MD, conductor 8–13 and the normally closed contacts of the key 9–05.

Relays 2–P and 2–C now operate if no other calls are registered. In the event the traffic operator and other dispatchers have registered calls, the operation of relays 2–P and 2–C will be affected in sequence with the operation of the 8–PT and 8–CT relays of the traffic operator and the P and C relays of the other dispatchers. The sequence of the operations of these relays are described in detail hereinafter.

Assuming relay 2–P operates operating relay 2–C, with the system now idle and relay 6–SS released, relay 2–C operates relay 1–R which locks to battery as previously described. In addition, the operation of relay 2–C releases relay 2–RV and transfers the previously described locking path for relay 2–CW from break contact 2–C to make contact 2–C, conductor 2–18, break contact 7–NA, Fig. 8, and the normally closed contacts of busy key 8–10. Relay 1–R operates to complete the previously described energizing paths for relays 8–TOS and 9–BL which turns on the transmitting carrier thus operating relay 6–SS. In addition, relay 1–R operates to supply A.C.-D.C. ringing current from source 7–03, which has a two-second ringing interval and a four-second silent interval, to the dispatcher via conductor 7–04, break contact 2–MR, Fig. 1, make contact 1–R the winding of relay 1–TP, make contact 1–R and conductor $R_5$. The ringing current from source 7–03 is also supplied to relay 7–RG by way of conductor 7–04, break contact 2–MR, make contact 1–R, conductor 1–05 and capacitor L, Fig. 7, operating relay 7–RG during the ringing interval and thus with relay 8–TOS operated applying the low tone source, Fig. 6, to the radio transmitter as previously described. Thus, a two-second ringing interval and a four-second silent interval is used to ring the dispatcher's bell as an indication that the call is in answer to his request to make a call.

The dispatcher answers the ringing signal by removing the handset and with relay 1–R operated, D.C. current is supplied from source 7–03 by way of conductor 7–04, break contact 2–MR, make contact 1–R, the winding of relay 1–TP, make contact 1–R, conductor $R_5$, conductor $T_5$ and make contact 1–R to ground operating relay 1–TP which locks via make contact 1–TP, break contacts 1–LB and 2–LA and make contact 2–C. Relay 1–TP operates to release relay 1–R. In releasing, relay 1–R releases relay 9–BL turning off the transmitting carrier and thereby releasing relay 6–SS. In addition, relay 1–R released, releases relay 8–TOS removing the low tone source from the transmitter as previously described. With relay 1–R released, the "off-hook" signal from the dispatcher operates relay 2–L which in turn operates relay 2–LA as previously described. Since relay 8–BS is operated, the operation of relay 2–L completes the operating path for relay 9–TOA by way of the normally closed contacts of key 9–01, the winding of relay 9–TOA, make contact 8–BS, conductor 9–04, make contact 2–C, Fig. 2, break contact 2–RV and make contact 2–L. Relay 2–LA operates to release relays 1–TP and 2–CW.

With relays 2–P, 2–C, 2–L, 2–LA and 9–TOA operated, the call proceeds in the same manner as a call originated when the system is idle with the exception that the subsequent operation of relay 7–MD releases relay 8–BS.

When the traffic operator attempts to make a call by inserting the plug, relays 3–CA, 9–CC and 9–CE are operated as previously described. With the system busy, relay 8–RVT is operated and relay 9–CE operates to complete a path from battery by way of the winding of relay 8–CWT, make contact 8–RVT and make contact 9–CE to ground and relay 8–CWT locks by way of make contact 8–CWT, break contact 9–CH, break contact 8–CT and the normally closed contacts of key 8–10.

Upon hearing the busy tone, the traffic operator removes the plug and relays 3–CA, 9–CC and 9–CE release. Relay 8–CWT remains operated, however, and maintains holding ground on relay 8–MI by way of make contact 8–CWT. In addition, relay 8–CWT completes an operating path for relay 8–PT from ground via make contact 8–CWT, the winding of relay 8–PT, break contacts 8–PT, 8–V, 7–S and 8–RN and the normally closed contacts of key 8–09 to battery and relay 8–PT locks to battery by way of make contact 8–PT.

As previously described, battery is extended to conductor 8–11 by way of the LA relay of the dispatcher using the circuit. Relay 8–CWT operates to connect conductor 8–11 to ground via the winding of relay 8–V and make contact 8–CWT. Relay 8–V operates to complete the operating path for relay 7–S which locks via make contact 7–S and break contact 7–U. Relay 7–S also operates to maintain holding ground on the winding of relay 8–A.

When the call is completed, the LA relay of the busy dispatcher releases releasing relay 8–V. As subsequently described, this operates relay 7–T which in turn operates relay 8–BS. Relay 7–T affects the operation of relay 7–U and relays 7–S, 7–T and 7–U release.

In the event that no other dispatcher has a call registered, relay 8–PT operates to complete a path from ground via make contact 8–A, Fig. 8, to conductor 2–11 via the break contacts of the P relays of the dispatchers in conductor 2–11 to conductor 8–07 and then to battery via make contact 8–PT, Fig. 8, the winding of relay 8–CT, break contacts 8–V, 7–S and 8–RN and normally closed contacts 8–09. Since the system is now idle and relay 6–SS is released, relay 8–CT operates to complete an energizing path for relay 7–ON from battery by way of break contacts 6–SS and 7–ON, the winding of relay 7–ON, and make contacts 8–CWT and 8–CT to ground and relay 7–ON locks to battery by way of its own make contact. Relay 8–CT also transfers the locking path for relay 8–CWT from break contact 8–CT to make contact 8–CT and break contact 7–NA.

Relay 7–ON operates to apply ground to the winding of relay 9–BL which in turn turns on the transmitting carrier operating relay 6–SS. Relay 7–ON also operates to complete an energizing path for relay 8–TOS. In addition, relay 7–ON operates to extend ground pulses from interrupter 8–04 to conductor 8–02 by way of make contact 7–ON. As previously described conductor 8–02 extends to the windings of relays 9–SA and 9–SB whereby the first ground pulse operates relay 9–SB followed by the operation of relay 9–SA. The second ground pulse operates relay 9–SC followed by the release of relays 9–SB, 9–SA and 9–SC. Relay 9–SB, while operated, applies low tone, Fig. 6, to the radio transmitter by way of make contact 9–SB, make contact 7–ON, break contacts 7–RG and 7–T and make contact 8–TOS thus indicating to the urban units that the traffic operator is being called. Relay 7–ON also completes an energizing path for the traffic operator signal indicator, not shown, from ground by way of make contact 7–ON, Fig. 3, auxiliary circuit conductor $T_{OA}$, the traffic signal indicator, not shown, auxiliary circuit conductor $R_{OA}$, make contact 7–ON to battery.

The operator answers in response to the energization of the signal indicator by inserting the plug operating relays 3–CA, 9–CC and 9–CE. Relay 9–CE operates to complete a path from battery by way of the winding of relay 9–CH, break contacts 8–RVT and 7–CG and make contact 9–CE to ground. Relay 9–CH operates to release relay 8–CWT which in turn releases relay 7–ON. Relay 7–ON released removes ground pulses from conductor 8–02 and removes the busy tone from the radio transmitter. In addition, relay 7–ON released releases relay 8–TOS.

With relays 8–PT, 8–CT, 3–CA, 9–CC, 9–CE, 9–CH, 9–BL and 6–SS operated, the call will progress in the same manner as a call initiated under idle circuit conditions with the exception that operated relay 8–BS is released by the subsequent operation of relay 7–MD.

*Enforced idle period*

Whenever a call is in progress all the tone receivers are disabled to discourage the mobile fleet units from attempting to make calls or register "calls waiting" and thus interfering with the call in progress. Since they cannot make call registrations when a call is in progress, a ten second enforced idle period is provided at the end of each call if there are "calls waiting." During this enforced idle period, relay 7–MD will be released permitting the tone receivers to operate their associated MR relays to register "calls waiting."

As previously described, when a "call waiting" is registered while the system is busy, the 8–CWT relay or a C.W. relay associated with a dispatcher operates and supplies ground to operate relay 8–V which, in turn, operates relay 7–S to prepare the control terminal for an enforced idle period. Relay 7–S operates to maintain holding ground on the winding of relay 9–BL.

When the call in progress is completed relay 7–S is maintained operated and relay 8–V releases as previously described, removing battery applied by way of key 8–09 and break contacts 8–RN, 7–S and 8–V and then to the winding relay 8–PT by way of break contact 8–PT, to the windings of the P relays by way of break contact 8–CT and conductor 2–03, to the winding of relay 8–CT and to the windings of the C relays by way of conductor 2–14. Thus, during the enforced idle period, calls cannot be registered by the operation of relay 8–PT or the P relays and relay 8–CT and the C relays are released whereby calls registered prior to the enforced idle period cannot be assigned into the circuit during the idle period.

The release of relay 8–V also completes the operating path for relay 7–T via make contact 7–S and break contact 8–V. Relay 7–T operates to complete the energizing path for relay 8–BS which locks via break contact 7–MD, as previously described. Relay 7–T also completes the operating path of relay 8–TOS whereby steady low tone is applied to the transmitter via make contacts 7–T and 8–TOS during the enforced idle period as an indication to the mobile fleet units that this time is reserved for them to register "calls waiting." In addition, relay 7–T operates to remove ground applied to the plate and control electrodes of tube $V_1$, Fig. 7, to apply positive battery to the plate electrode of tube $V_1$ and to charge capacitor 7–11 thus starting the ten-second timing circuit of tube $V_1$.

After approximately ten seconds, capacitor 7–11 charges sufficiently to fire tube $V_1$ which operates relay 7–U and relay 7–U releases relay 7–S. Relay 7–S reapplies battery to the windings of relays 8–PT and 8–CT and the P and C relays associated with the dispatchers and releases relay 9–BL only if no mobile fleet units have registered a "call waiting," as described hereinafter. Relay 7–S released also releases relay 7–T which, in turn, removes the low tone from the transmitter. Relay 7–T released also releases relay 8–TOS if no mobile calls have been registered. In addition, relay 7–T released extinguishes tube $V_1$ releasing relay 7–U. The release of relays 7–S, 7–T and 7–U signify the end of the enforced idle period whereupon the waiting calls of the traffic operator or dispatchers are assigned into the circuit, as previously described, or the mobile calls are assigned as subsequently described.

*Call waiting registration and assignment—Mobile fleet unit*

When a mobile fleet unit operator attempts to make an outgoing call, he removes the handset from its hanger and monitors the system. If a call is in progress, he waits for the steady low tone to indicate the enforced idle period at the end of the call, then momentarily operates his push-to-talk button and hangs up. This operation turns on the mobile transmitter carrier and modulates it with the associated channel identification tone. This tone is received by the control terminal and the associated tone receiver operates, for example, relay 2–MR, as previously described, and relay 2–MR locks operated and supplies ground to the winding of relay 2–P to assign the call into the sequence selector circuit described hereinafter. In addition, relay 2–MR completes a path shunting make contact 2–CW in the previously described operating path of relay 8–V whereby relay 8–V will operate during the subsequent call in the event that other waiting calls are prior in the sequence. This assures an enforced idle period after each call until all the waiting calls are answered.

The operation of tone receiver relay 1–K in response to the reception of the channel tone also completes a path from ground to conductor 7–05 by way of a make contact of relay 7–T, which is operated during the enforced idle period, and then via make contact 1–K, conductor 1–12 and the winding of relay 2–MA to battery. Relay 2–MA operates to complete a path from battery via relay 8–RN, conductor 8–08 and make contact 2–MA, Fig. 2, to ground. Relay 8–RN operates to lock relay 2–MA via make contact 2–MA, break contact 2–MV, conductor 2–19 and make contact 8–RN, Fig. 8, to ground. Relay 8–RN also operates to supply holding ground for relays 8–TOS, 8–A and 9–BL. It is recalled that these relays are operated during the enforced idle period. Relay 8–RN operated also removes the previously described path supplying battery to relays 8–PT and 8–CT and the P and C relays associated with the dispatcher so that the C relays and relay 8–CT are maintained released to prevent the assignment of the next call.

At the end of the enforced idle period, relay 7–T releases, as previously described, extending ground pulses from interrupter 8–04 to lead 8–02 via break contact 7–T and make contact 8–RN and then to the winding of relay 9–SB. This alternately operates and releases relays 9–SA, 9–SB and 9–SC in the same manner as previously described.

Assuming that calls are registered with the mobile units associated with the dispatcher circuits of Figs. 4 and 5 and the dispatcher circuits of Figs. 1 and 2, relays 2–MA and 5–MA would therefore be operated. The operation of relays 9–SB and 9–SC applies ground to conductor 8–14 which extends via make contact 5–MA, the winding of relay 5–MA and the winding of relay 5–MV to battery. Relay 5–MV operates to open the previously described locking path for relay 5–MA. In addition, with relay 8–TOS operated, relay 5–MV operates to activate the tone generator of Fig. 4, as previously described, and apply tone to the transmitter via make contact 5–MV, conductor 1–02, break contacts 7–ON, 7–RG, and 7–T, Fig. 6, and make contact 8–TOS. This turns on the loudspeakers of the mobile unit fleet associated with the first dispatcher to indicate a registered "call waiting."

The subsequent release of relays 9–SB and 9–SC removes ground from the windings of relays 5–MA and 5–MV whereupon they release, turning off the tone generator of Fig. 4. The next operation of relays 9–SB and 9–SC applies ground to the winding of relay 2–MA by way of the break contact of relay 5–MA and the break contacts of the MA relays of the other dispatchers in conductor 8–14 which extends via make contact 2–MA, the winding of relay 2–MA and the winding of relay 2–MV to battery. Relay 2–MV operates to activate the tone generator of Fig. 1 in the same manner as described above whereby the acknowledgment tones are transmitted in sequence.

The subsequent release of relays 9–SB and 9–SA release relays 2–MA and 2–MV and when the last MA relay releases relay 8–RN releases. Relays 8–BL and 8–TOS then release and battery is reapplied to the P and C relays to permit the assignment of the next waiting call.

When the "call waiting" registered by the mobile unit associated with the fifth dispatcher, for example, is assigned into this system, the 2–MR relay operates its associated 2–P relay to complete the call in the same manner as a mobile call originated when the system is idle with the exception that relay 2–RV is released by the operation of relay 2–C, relay 9–TOA is operated via make contact 8–BS, as previously described and relay 8–BS is released by the operation of relay 7–MD. The ringing signal applied to the dispatcher's line is determined by the condition of the relay 2–MR and if a "call waiting" is registered by both a dispatcher and a mobile unit associated with the same channel the ringing signal indicates the call from the mobile unit. This preference is chosen to provide an indication to the dispatcher that there is an incoming call from a mobile unit since it is presumed that the dispatcher will know he has registered a "call waiting."

*Sequential assignment of calls waiting*

When "calls waiting" are registered into a busy system, they are assigned into a system in a predetermined sequence regardless of the order in which they were requested. Whenever a call is in progress, relays 8–PT and 8–CT of the busy traffic operator or the P and C relays associated with the dispatcher making the call are operated as well as relays 8–A and 8–B. If a "call waiting" is registered by a lower number dispatcher such as the first dispatcher, for example, or an associated fleet unit, relay 5–CW or 5–MR operates and locks but relay 5–P is prevented from operating because the battery supplied via conductors 2–03 and 2–09 is removed by the break contact of relay 8–CT or the C relay associated with the call in progress. If a "call waiting" is registered by the traffic operator or by a higher number dispatcher, such as the fifth dispatcher, for example, relay 8–PT or 2–P, respectively, will operate and lock but relay 8–CT or 2–C is prevented from operating by removal of the control ground supplied through the break contacts of the lower numbered P relays in conductor 2–11. Thus, for the purpose of this discussion, relay 8–PT and 8–CT can be considered the highest numbered P and C relays, respectively.

When the call in progress is completed, ground is restored to the next higher numbered C relay associated with an operated P relay to prepare the C relay for operating and assigning the "call waiting" to the system. Before the call can be assigned, it is necessary to provide the enforced idle period. During this time and the subsequent time required to notify any mobile units that their calls have been accepted, battery for the C and P relays is removed by the operation of relays 7–S and 8–RN, as previously described. Thus, the unoperated P relays and all the C relays are maintained released and the next call is not assigned until relays 7–S and 8–RN release.

At the end of the enforced idle period, relay 7–S releases followed by the release of relay 8–RN when all mobile units have been informed that their calls have been accepted. This supplies battery to the unoperated P relays and all the C relays, as previously described. However, the P relays are slow-to-operate permitting the next higher number C relay to operate first and thus maintain the lower number P relays released.

If all the "calls waiting" are registered with lower number channels, none of the P relays associated with "call waiting" channels will be operated as described above. At the end of the enforced idle period, hereinabove discussed, when battery is restored to the P and C relays, all the P relays associated with the "calls waiting" are released and therefore have a tendency to operate simultaneously. In this case the first P relay to operate would operate its associated C relay to seize the channel and the others would be locked out. This does not provide equitable channel access. Relays 8–A and 8–B are provided to eliminate this possibility. Relay 8–A is held operated during the call by the operated P relay and during the enforced idle period by relays 7–S and 8–RN. At the end of the call the operated P relay releases and one holding path for relay 8–A is opened since all other P relays are released. At the end of the enforced idle period relays 7–S and 8–RN release opening the remaining holding paths for relay 8–A. The release of relay 8–RN also restores battery to the P relays permitting them to operate. However, when relay 8–A releases, slow-to-release relay 8–B remains operated for a short time. Thus the ground for operating the C relays is removed during the time relay 8–B is operated and relay 8–A is released. The release time of relay 8–B is long enough to insure the operation of all P relays associated with "calls waiting" before the C relays can operate. When the P relay associated with the lowest number channel having a "call waiting" operates, it opens up the control path of all higher numbered C relays and they are prevented from operating when the control ground is restored by the release of relay 8–B. Thus each sequence of calls will start with the lowest numbered channel having registered a "call waiting."

*Dispatcher or traffic operator "don't answer" disconnect*

Whenever a mobile unit signals its dispatcher or traffic operator or either of the latter is assigned into the system in answer to a request to make a call, all other calls are locked out until the call is completed or disconnected. In order to prevent a "don't answer" from tying up the system, the call is disconnected in approximately 30 seconds if the dispatcher or operator does not answer.

Whenever relay 8–CT or a C relay operates to assign the registered call of the operator or the dispatcher, relay 8–NU operates and remains operated until the call is answered and relay 9–CE or an LB relay is operated. The above-described operation of relay 8–CT completes a path from battery via the winding of relay 8–NU, make contact 8–CT, break contact 9–CE and break contact 7–NA to ground. The operation of relay 2–C, for example, completes a path from battery via the winding of relay 8–NU, conductor 8–15, make contact 2–C, break contact 2–LB, conductor 2–20 and the above-mentioned break contact 7–NA to ground. Relay 8–NU starts the timing circuit associated with gas tube $V_2$, Fig. 7. If the call is not answered in approximately 30 seconds, the gas tube $V_2$ triggers and relay 7–NA operates to open up the previously described holding path for relay 8–CWT via make contact 8–CT and open the holding path for the C.W. and M.R. relays associated with the called dispatcher via the make contact of their associated C relay and, in common, via break contact 7–NA, Fig. 8, and key 8–10, thereby permitting relay 8–CWT or the C.W. and M.R. relays to release. The operation of relay 7–NA also releases relay 8–NU and completes a holding path to ground for the relay 8–PT via make contacts 7–NA and 8–CT or for the P relay, for example relay 2–P, via the above-mentioned make contact 7–NA, conductor 8–16 and make contact 2–C, Fig. 2. In addition, relay 7–NA completes a holding path for relay 8–MI. Relay 8–NU released extinguishes tube $V_2$ which, in turn, prepares the release of relay 7–NA.

The release of relay 8–CWT or the C.W. and M.R. relays opens up the ground path for relay 8–PT or the associated P relay but the relay does not release until the holding path is removed by the release of relay 7–NA. If relay 8–PT or the P relay were permitted to release immediately, the next C relay would operate and allow its C.W. and M.R. relays to release before relay 7–NA was released. Thus more than one "call waiting" would be disconnected. Relay 7–NA is slow-to-release to permit relay 8–NU to release and discharge the timing circuit condensers before relay 7–NA releases. When relay 7–NA releases the P relay releases followed by the release of the C relay and the R relay or relay 7–ON to disconnect the call and allow the next call to be connected immediately without an enforced idle period. If there are no waiting calls, the control terminal reverts to its idle condition.

*Alarm circuits*

A short circuit or "receiver off-hook" on a dispatcher's line establishes a call and prevents the use of the system by any other dispatcher until the troubled condition is remedied. The dispatcher out-of-service alarm provides an indication when this condition occurs in order that the control terminal can be restored to service. Since legitimate calls cannot be distinguished from troubled conditions, all "receiver off-hook" conditions start a 2.5 minute timing circuit. If during that time there is no response from a mobile unit, it is assumed to be a trouble condition and the major central office alarms are actuated.

Whenever a call is established by a dispatcher, relays 9–BL and 7–MD are operated, as described above. Relay 9–BL operated, applies positive battery to the plate electrode of tube $V_3$, Fig. 7, and to the timing circuit associated with tube $V_3$ via make contact 9–BL and break contact 6–COD. With relay 7–MD operated, if relay 6–COD is not operated within approximately 30 seconds, tube $V_3$ triggers to operate relay 7–DO which locks to battery via its own make contact, resistor $R_3$, break contact 6–COD and make contact 9–BL. Relay 7–DO operates to open the conduction circuit of tube $V_3$ and discharge the timing circuit associated with tube $V_3$. Relay 7–DO also operates to complete the energizing circuit of time delay thermal relay 7–DAD. Relay 7–DAD has an operate time of approximately two minutes and, in the event the call is not answered in that interval and relay 6–COD does not operate or relay 9–BL does not release to release relay 7–DO, relay 7–DAD operates to complete an operating path for relay 7–AL via make contact 7–DAD and break contact 7–DA. Relay 7–DAD also applies ground to alarm lamp 7–06 via make contact 7–DAD and make contact 7–DO energizing the lamp. Relay 7–AL operates to supply energizing ground to an alarm circuit, not shown but represented by rectangle 7–07.

There is no provision for automatically disconnecting the dispatcher circuit but the alarm circuit can be deenergized by a momentary operation of the dispatcher alarm release key 7–08. Operation of key 7–08 operates relay 7–DA which locks via make contacts 7–DA and 7–DAD. Relay 7–DA operates to energize dispatcher alarm release lamp 7–09 and to release relay 7–AL which, in turn, opens the energizing circuit of alarm circuit 7–07.

Clearance of the trouble condition occurs by the operation of relay 6–COD or release of relay 9–BL thereby releasing relay 7–DO. Relay 7–DO opens the energizing circuit of relay 7–DAD and when relay 7–DAD releases, relay 7–AL or 7–DA releases.

If the station transmitter fails to radiate carrier when relay 9–BL operates, relay 6–SS will remain released applying battery to the winding of time delay thermal relay 7–TA via break contact 6–SS, make contact 9–BL and break contact 7–AL. If the trouble condition persists, relay 7–TA operates in about ten seconds completing a path from ground via the winding of relay 7–AL, make contact 7–TA, make contact 9–BL and break contact 6–SS to battery. Relay 7–AL operates and locks via make contact 7–AL, make contact 9–BL and break contact 6–SS. Relay 7–AL operates to open the energizing circuit of relay 7–TA and to complete the energizing circuit of alarm circuit 7–07. In addition, relay 7–AL operates to complete an energizing path from battery via break contact 6–SS, make contact 7–AL, transmitter failure lamp 7–15 and break contact 7–DO to ground. The alarm condition is released by the release of relay 9–BL or the operation of relay 6–SS, thereby releasing relay 7–AL.

If relay 6–SS operates to indicate carrier radiation with relay 9–BL released, battery is applied to relay 7–TA via make contact 6–SS, break contact 9–BL and break contact 7–AL. If this condition persists, relay 7–TA operates applying battery to the winding of the relay 7–AL via make contact 6–SS, break contact 9–BL and make contact 7–TA. Relay 7–AL locks via break contact 9–BL and make contact 6–SS and releases relay 7–TA and activates the alarm. In addition, relay 7–AL completes an energizing path from battery via make contact 6–SS, make contact 7–AL, transmitter false lamp 7–16 and break contact 7–DO to ground. The alarm condition is released by the release of relay 6–SS or the operation of relay 9–BL.

*Testing and monitoring circuits*

The control terminal has facilities which permit a technical operator to manually take over the control of the system whenever necessary for maintenance purposes. A telephone circuit shown in the lower portion of Fig. 3 is provided to permit the technical operator to talk or monitor over the system using handset 3–03. Removing handset 3–03 from its cradle bridges the receiving portion across repeating coil M which in turn is connected across conductors R and T enabling the technical operator to monitor calls within the system. In addition, removing handset 3–03 from its cradle bridges the transmitting portion of the handset across repeating coil A.

If the technical operator desires to talk over the system, it is necessary to operate the talk radio key or the talk line key. The operation of the talk radio key connects repeating coil A across conductors T and R by way of the normally open contacts 3–04 and 3–05 of the talk radio key. The operation of the talk radio key also connects negative battery to the transmitter portion of handset 3–03 by way of the normally open contacts 3–06 of the talk radio key and inductance coil B. In addition, the operation of the talk radio key supplies ground to relay 9–BL by way of the normally opened contacts 9–05 of the talk radio key thus operating relay 9–BL which turns on the transmitter carrier.

The operation of the talk line key connects repeating coil A across conductors T and R by way of normally open contacts 3–07 and 3–08 of the talk line key and connects negative battery to the transmitter portion of handset 3–03 by way of normally open contacts 3–09 of the talk line key and inductance coil B. In addition, the operation of the talk line key opens the previously described operating paths for relays 9–BL and 9–TOA by way of normally closed contacts 9–01 of the talk line key.

A system busy key is provided to disable the system and prevent any calls from being completed by the control terminal. Operation of the system busy key removes battery supplied to the windings of relays 8–PT and 8–CT and the P and C relays by way of normally closed contacts 8–09 of the system busy key. The operation of the system busy key also opens the previously described locking paths for relay 8–CWT and the C.W. and M.R. relays by way of normally closed contacts 8–10 of the system busy key. In addition, the operation of the system busy key supplies ground to the winding of relay 8–A by way of normally opened contacts 8–17 of the system busy key and relay 8–A operates to complete the operating paths of relay 8–RVT and the RV relays as previously described whereby busy tone is applied to the circuits of the dispatchers and the 2-way traffic operator.

In the event that a dispatcher mobile unit attempts to make a call while the system busy key is operated, mobile unit call lamp 8–19 is provided to indicate to the technical operator that a mobile unit is calling. Assuming a mobile unit associated with the fifth dispatcher initiates a call, relay 2–MR is momentarily operated in the same manner as previously described but does not lock up insofar as normally closed contacts 8–10 of the system busy key are open. Relay 2–MR while operated completes a path from ground via normally open contacts 8–10 of the system busy key, conductor 8–18, contacts 2–MR, Fig. 2, conductor 2–21 and the winding of relay 8–BS to battery and relay 8–BS locks via make contact 8–BS, break contact 7–MD, conductor 8–13 and normally closed contacts 9–05 of the talk radio key. Relay 8–BS operates to complete an energizing path for lamp 8–19 by way of the normally open contacts 8–09 of the system busy key and make contact 8–BS. A technical operator answers the call by removing the handset 3–03 from the cradle and operating the talk radio key which opens the previously described locking path for relay 8–BS. Relay 8–BS releases and opens the energizing path for lamp 8–19. The technical operator is now connected across conductors T and R as previously described whereby he can proceed to talk to the mobile unit.

Associated with each dispatcher's line is a mobile unit signal key and a dispatcher signal key which permits the technical operator to signal the mobile units or dispatchers by momentarily operating the desired key. The mobile unit signal key associated with the fifth dispatcher includes normally open contacts 1–07 and 2–22. To call a mobile unit assoicated with the fifth dispatcher a technical operator removes handset 8–03 and operates the talk radio and system busy keys. This connects handset 6–03 across to conductors T and A, turns on the transmitter carrier and applies busy tone to the circuits of the dispatchers and the traffic operator as previously described. The traffic operator then momentarily operates the mobile unit signal key momentarily operating relay 1–LB by way of contacts 1–07 and momentarily operates relay 8–TOS by way of contacts 2–22 and conductor 8–03.

Relays 1–LB and 8–TOS while operated activate the tone generator of Fig. 1 and modulate the transmitter carrier with the tone generator output as previously described. This turns on the loudspeakers of the mobile units associated with the fifth dispatcher. The technical operator then designates the desired mobile unit by voice. At the conclusion of the call the technical operator releases the talk radio and system busy keys releasing relays 8–A and 9–BL and return the system to the idle condition.

The dispatcher signal key assoicated with the fifth dispatcher includes normally open contacts 2–23. To call the fifth dispatcher the technical operator removes handset 3–03 and operates the talk line key. This connects handset 3–03 across conductors T and R and opens the operating paths of relays 9–BL and 9–TOA as previously described. The momentary operation of the dispatcher signal key operates relay 2–MR by way of contacts 2–23 and relay 2–MR locks by way of conductor 2–17 as previously described. The operation of relay 2–MR affects the ringing of the dispatcher and the call proceeds in the same manner as previously described for an incoming call from a mobile unit with the exception that relay 9–BL is maintained released and the transmitter does not radiate carrier.

The technical operator's position is equipped with dial 3–10 and associated "to-dial" key 3–11 for controlling the selective signaling oscillator to signal urban mobile units. The technical operator initiates a call to an urban mobile unit by removing handset 3–03 and operating the system busy and talk radio key busying out the dispatcher and traffic operator and operating relay 9–BL. The "to-dial" key 3–11 is then operated placing ground on the winding of relay 6–PD by way of dial 3–10, normally open contacts 3–11 and lead 3–12. As previously described, relay 6–PD operates to connect the output of the selective signaling oscillator to the line and condition the oscillator to send 600-cycle tone. In order to assure that all mobile units are clear, the technical operator must dial a preliminary "1" digit. This removes and reapplies ground to lead 3–12 shifting the oscillator frequency to 1500 cycles as previously described. The operator then dials the code for the desired urban unit. The resultant removal and reapplication of ground to conductor 3–12 conditions the selector signaling oscillator to alternately send 600 and 1500-cycle tone. When the operator has completed dialing the desired call, he must wait a reasonable time to allow the call indicator in the urban unit to operate before releasing the "to-dial" key. The release of this key removes ground from lead 3–12 and conditions the oscillator to send 1500 cycles to clear the selector in the call mobile unit. Thereafter the output of the oscillator is removed from the line and the talking path to the technical operator is closed as previously described. The operator concludes the call by releasing the talk radio key thereby releasing relay 9–BL and turning off the transmitting carrier.

Although a specific embodiment of the invention has been shown and described, it will be understood that various modifications may be made without departing from the spirit of this invention and within the scope of the appended claims.

What is claimed is:

1. In a radio telephone communication system, a radio communication channel, a dispatcher telephone station, a dial-controlled telephone station, a tone generator for generating a tone individual to said dispatcher station, a selective signaling oscillator for generating a pair of tones, pulse responsive means responsive to dial pulses from said dial station for alternately applying said pair of tones to said channel, means responsive to the initiation of a call by said dispatcher for selectively connecting said dispatcher and said tone generator to said channel, means responsive to the initiation of a call by said dial station for selectively connecting said dial station to said channel, means responsive to said connection of said dispatcher to said channel for excluding said dial station from access to said channel and precluding the operation of said pulse responsive means and means responsive to said connection of said dial station to said channel for exluding said dispatcher and said tone generator from access to said channel.

2. In a radio telephone communication system in accordance with claim 1 a timing circuit effective in the absence of dial pulses from said telephone exchange, means jointly responsive to said connection of said dial station to said channel and a dial pulse from said dial station for initiating the operation of said timing circuit and means responsive to the operation of said timing circuit at the end of the timing period thereof for disabling said pulse responsive means.

3. In a radio telephone communication system, a radio communication channel, a dispatcher telephone station, a plurality of mobile dispatcher units, a dial-controlled telephone station, selective signaling means responsive to dial pulses from said telephone exchange for generating dial tone signals, means responsive to the initiation of a call by said dispatcher for selectively interconnecting said dispatcher and said dispatcher units by way of said channel, means responsive to the initiation of a call by said dial station for applying said dial tone signals to said channel, means for registering calls waiting by said dispatcher units, sequence signaling means responsive to said registration for signaling said calling dispatcher units in a predetermined sequence that their calls have been registered, and further means for precluding the connection of said dispatcher with said dispatcher units and precluding the operation of said selective signaling means while said sequence signaling means is signaling said calling units.

4. A radio telephone communication system having a plurality of telephone stations, a fleet of mobile units individual to each of said telephone stations, a two-way radio communication channel, a control station for interconnecting each of said telephone stations to said fleet of units individual to said telephone station by way of said channel, means at said central station for registering calls waiting by said mobile units and sequence signaling means responsive to said registration for signaling said calling units in a predetermined sequence that their calls have been registered.

5. A radio telephone communication system in accordance with claim 4 including means jointly responsive to the completion of a call and the registration of calls waiting for applying a signal to said channel to invite the registry of calls waiting by said mobile units.

6. A radio telephone communication system in accordance with claim 4 wherein said sequence signaling means includes a plurality of sources of tone signals, each of said sources of tone signals individual to each of said fleets of units.

7. A radio telephone communication system having a plurality of telephone stations, a fleet of mobile units associated with each of said telephone stations, a two-way radio communication channel, a control station for interconnecting each of said telephone stations to said fleet of units associated with said telephone station by way of said channel, a plurality of sources of tone signals at said central station, each of said sources of tone signals individual to each of said telephone stations, means at said central station for registering calls waiting from said mobile units to associated ones of said telephone stations, means jointly responsive to the completion of a call and said registration for excluding said interconnections of said telephone stations to said fleets of units, and sequence signaling means responsive to said registration for applying each of said sources of tone signals individual to each of said called telephone stations to said channel in a predetermined sequence.

8. A mobile two-way radio telephone system having a control station, a selecting circuit at said control station, a fleet dispatcher's station, a telephone line connecting said dispatcher's station to said control station, a tone generator for generating a tone individual to said dispatcher's station, a dial telephone exchange, a telephone line connecting said telephone exchange to said control station, a radio transmitter, selective signaling means at said central exchange responsive to dial pulses from said telephone exchange for applying dial tone signals to said radio transmitter, means for selectively connecting said dispatcher's station through said selecting circuit to said radio transmitter at a first time, means responsive to said connection for applying said individual tone to said radio transmitter, further means responsive to said connection for excluding said telephone exchange from access to said radio transmitter and precluding the operation of said selective signaling means at said first time, means for selectively connecting said telephone exchange through said selecting circuit to said radio transmitter at a second time, means responsive to said latter connection for excluding said dispatcher's station from access to said radio transmitter at said second time, means responsive to said connection of said dispatcher's station to said radio transmitter for signaling said telephone exchange that said system is busy and means responsive to said connection of said telephone exchange to said radio transmitter for signaling said dispatcher's station that said system is busy.

9. A mobile two-way radio telephone system having a control station, a selecting circuit at said control station, a fleet dispatcher's station, a telephone line connecting said dispatcher's station to said control station, a tone generator for generating a tone individual to said dispatcher's station, a dial telephone exchange, a telephone line connecting said telephone exchange to said control station, a radio transmitter, selective signaling means at said central exchange responsive to dial pulses from said telephone exchange for applying dial tone signals to said radio transmitter, means for selectively connecting said dispatcher's station through said selecting circuit to said radio transmitter at a first time, means responsive to said connection for applying said individual tone to said radio transmitter, further means responsive to said connection for excluding said telephone exchange from access to said radio transmitter and precluding the operation of said selective signaling means at said first time, means for selectively connecting said telephone exchange through said selecting circuit to said radio transmitter at a second time, means responsive to said latter connection for excluding said dispatcher's station from access to said radio transmitter at said second time, a sequence circuit at said control station, means responsive to an attempted call by said telephone exchange at said first time for registering a call waiting in said sequence circuit and means responsive to said registration and the termination of said dispatcher's call at said first time for signaling said telephone exchange.

References Cited in the file of this patent

UNITED STATES PATENTS

| | | |
|---|---|---|
| 2,744,965 | Molnar | May 8, 1956 |
| 2,843,675 | Collins | July 15, 1958 |